US012662397B2

(12) United States Patent
Singh et al.

(10) Patent No.: US 12,662,397 B2
(45) Date of Patent: Jun. 23, 2026

(54) COMPOUNDS AND PROCESSES FOR REMEDIATION OF PERFLUOROALKYL SUBSTANCES

(71) Applicant: Weaver Labs, LLC, Stillwater, OK (US)

(72) Inventors: Anuradha Singh, Stillwater, OK (US); Jimmie D. Weaver, Stillwater, OK (US); Richard Lynch, Stillwater, OK (US); Jacob Solomon, Stillwater, OK (US)

(73) Assignee: Weaver Labs, LLC, Stillwater, OK (US)

( * ) Notice: Subject to any disclaimer, the term of this patent is extended or adjusted under 35 U.S.C. 154(b) by 395 days.

(21) Appl. No.: 18/198,596

(22) Filed: May 17, 2023

(65) Prior Publication Data

US 2024/0010524 A1 Jan. 11, 2024

Related U.S. Application Data

(60) Provisional application No. 63/343,327, filed on May 18, 2022.

(51) Int. Cl.

| | |
|---|---|
| ***C02F 1/28*** | (2023.01) |
| ***C07F 7/08*** | (2006.01) |
| *C02F 101/36* | (2006.01) |
| *C02F 103/06* | (2006.01) |

(52) U.S. Cl.

CPC ............ *C02F 1/285* (2013.01); *C07F 7/0834* (2013.01); *C02F 2101/36* (2013.01); *C02F 2103/06* (2013.01); *C02F 2303/16* (2013.01)

(58) Field of Classification Search

CPC ............................... C07F 7/0834; C02F 1/285

See application file for complete search history.

(56) References Cited

U.S. PATENT DOCUMENTS

2017/0362257 A1* 12/2017 Venema ............. C08G 18/4833

OTHER PUBLICATIONS

Ali, et al. "Ionic magnetic core-shell nanoparticles for DNA extraction." RSC advances 10.64 (2020): 38818-38830 (Year: 2020).*

* cited by examiner

*Primary Examiner* — Anthony J Zimmer
*Assistant Examiner* — Eric Scott Sherman
(74) *Attorney, Agent, or Firm* — Polsinelli PC

(57) ABSTRACT

The present disclosure provides compounds of Formula (I), their methods of preparation, their methods of regeneration of the compound of Formula (I), and their methods of use for binding perfluoroalkyl substances (PFAS) contaminates from sources of PFAS contaminated water.

12 Claims, 20 Drawing Sheets

COMPOUNDS AND PROCESSES FOR REMEDIATION OF PERFLUOROALKYL SUBSTANCES

CROSS-REFERENCE TO RELATED APPLICATION

This application claims benefit of U.S. Provisional Patent Application No. 63/343,327, which was filed in the U.S. Patent and Trademark Office on May 18, 2022, the entire contents of which are incorporated herein by reference for all purposes.

FIELD OF THE DISCLOSURE

The present disclosure relates to compounds of Formula (I), their methods of preparation, their methods of regeneration of the compound of Formula (I), and their methods of use for binding perfluoroalkyl substances (PFAS) contaminates from sources of PFAS contaminated water supply.

BACKGROUND OF THE INVENTION

Per and polyfluoroalkyl substances (PFAS) are a class of synthetic chemicals where most or all hydrogen atoms are replaced with fluorine such as perfluorooctanoic acid (PFOA), and perfluorooctane sulfonic acid (PFOS). Unique features, such as thermal-chemical stability, hydrophilic-lipophilic characteristics, and aqueous surface tension-lowering properties have made PFAS a tractive candidates to be used in products such as nonstick cookware, food packaging, waterproof jackets, carpets, furniture, firefighting foams, hydraulic fluids for aircrafts, cosmetics, household products, and many other consumer products since the 1950s. Due to their prolific use, extreme resistance to degradation, and environmental persistence, they have been nicknamed as "forever chemicals."

PFAS have been detected in drinking water, surface water and groundwater at thousands of locations in the US. For instance, The Environmental Working Group performed a study across the US assessing the concentration of PFOA, PFOS and a few other PFAS members and concluded that greater than 200 million Americans consumed water with PFOA and PFOS at ppt (parts per trillion) or higher levels [19]. Exposure to PFAS is associated with adverse health impact in humans, such as increased risk of different types of cancer, thyroid disease, birth defects, immune effects and many more.

Growing health concerns related to PFAS exposure have caused the US EPA (Environmental Protection Agency) to set a health advisory limit of 70 ppt for a combined concentration of PFOA and PFOS in drinking water. Furthermore, many other states have set even more rigorous PFAS concentration limits in drinking water. Drinking PFAS contaminated water is a major human exposure route. Thus, it requires remediation of contaminated sites including groundwater especially around airport and military bases, as well as many rivers, lakes, and municipal water supplies that have been negatively impacted by PFAS.

What is needed is a material which would selectively remove PFAS contaminates from ground water.

FIGURES

SUMMARY OF THE INVENTION

Figure 1:
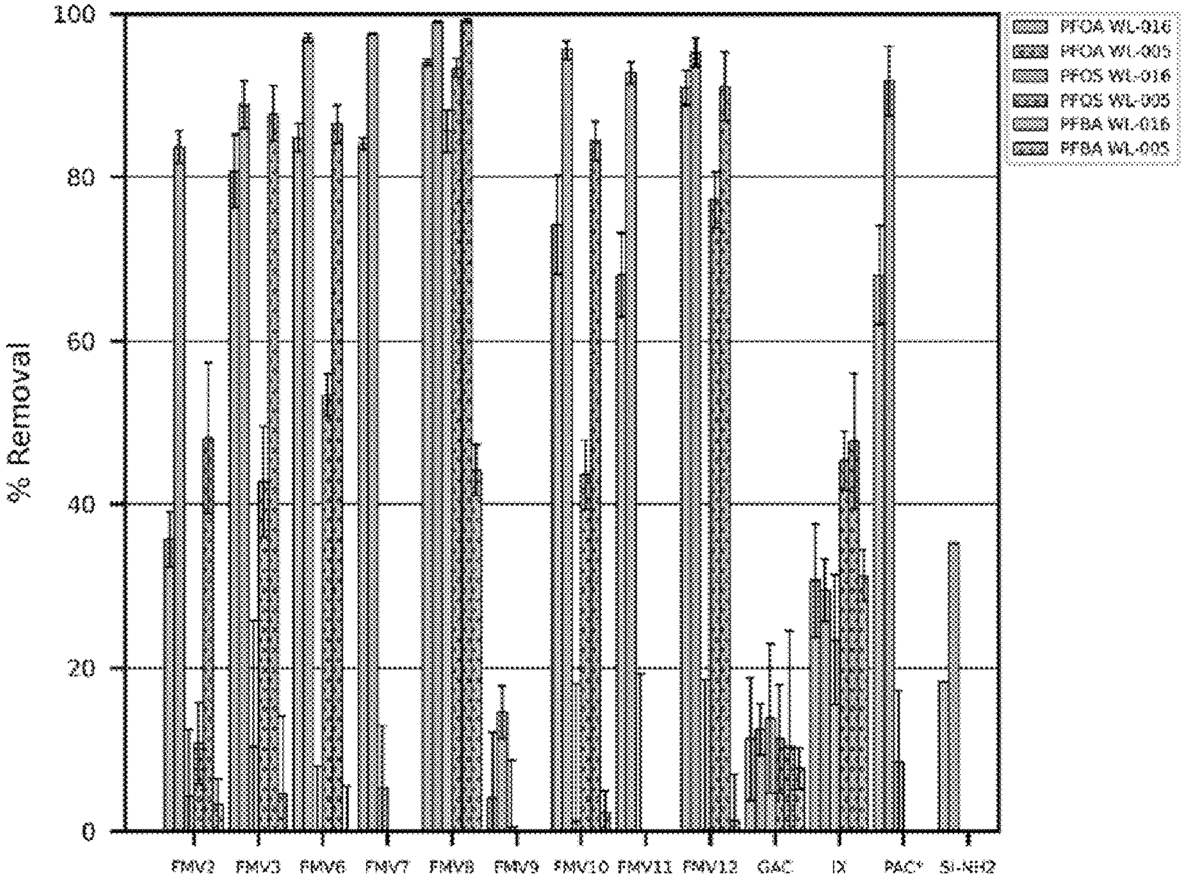
FIG. 1 is a bar graph showing the fractional removal (%) of PFOA PFOS, and PFBA from Altus AFB groundwater PAC* was run under the same conditions but at a different time. Si—$NH_2$ was run in singlet.

In one aspect, disclosed herein, is a compound of Formula (I) or a salt thereof:

Formula (I)

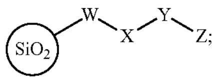

wherein W is selected from the group consisting of $C_1$-$C_8$ unsubstituted alkyl and $C_1$-$C_8$ substituted alkyl;

X is selected from the group consisting of NH, $N(C_1$-$C_4)$, $N^+(C_1$-$C_4)_2$, NHCO, $NHCH_2CONH$, a nitrogen heterocycle, a cationic nitrogen heterocycle, and absent;

Y is selected from a group consisting of $C_1$-$C_8$ unsubstituted alkyl, $C_1$-$C_8$ substituted alkyl, substituted aromatic, and absent; and Z is selected from the group consisting of substituted aromatic, $C_1$-$C_{12}$ unsubstituted alkyl, $C_1$-$C_{12}$ substituted alkyl.

In another aspect, disclosed herein, is a method of removing a PFAS contaminate from a PFAS contaminated water supply comprising: a) contacting the PFAS contaminated water supply with a compound of Formula (I), b) binding the PFAS contaminate with the compound of Formula (I) forming the PFAS bound compound of Formula (I); and c) isolating the PFAS bound compound of Formula (I) from the PFAS contaminated water supply.

In still another aspect, disclosed herein, is method for the regeneration of the compound of Formula (I) from a PFAS bound compound of Formula (I) comprising: a) washing the PFAS bound compound of Formula (I) with different concentrations of an aqueous solvent, an organic solvent, different mixtures of an organic/different concentrations of an aqueous solvent mixture, or a combination thereof forming the compound of Formula (I); b) washing the compound of Formula (I) from step (a) with water; and c) drying the compound of Formula (I) from step b).

Other features and iterations of the invention are described in more detail below.

DETAILED DESCRIPTION OF THE INVENTION

The present disclosure provides compounds of Formula (I), methods for preparing the compound of Formula (I), method of regeneration of the compound of Formula (I), and methods of removing PFAS contaminate from a PFAS contaminated water supply.

(I). Compounds of Formula (I)

In one aspect of the present disclosure encompasses compounds of Formula (I):

Formula (I)

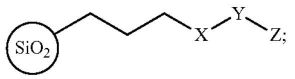

wherein

W is selected from a group consisting of $C_1$-$C_8$ unsubstituted alkyl and $C_1$-$C_8$ substituted alkyl;

X is selected from the group consisting of NH, N($C_1$-$C_4$), $N^+$($C_1$-$C_4$)$_2$, NHCO, $NHCH_2CONH$, a nitrogen heterocycle, a cationic nitrogen heterocycle, and absent;

Y is selected from a group consisting of $C_1$-$C_8$ unsubstituted alkyl, $C_1$-$C_8$ substituted alkyl, substituted aromatic, and absent; and Z is selected from the group consisting of substituted aromatic, $C_1$-$C_{12}$ unsubstituted alkyl, $C_1$-$C_{12}$ substituted alkyl.

In general, in accordance with embodiments, W is selected from a group consisting of $C_1$-$C_8$ unsubstituted alkyl and $C_1$-$C_8$ substituted alkyl. In certain embodiments, W is selected from a group consisting of $CH_2$, $CH_2CH_2$, $CH_2CH(CH_3)CH_2$, $CH_2CH_2CH_2$, $CH_2CH_2CH_2CH_2$, $CH_2CH_2CH_2CH_2CH_2$, and $CH_2CH_2CH_2CH_2CH_2CH_2$. In one embodiment, W is $CH_2CH_2CH_2$.

Generally, in accordance with embodiments, X is selected from the group consisting of NH, N($C_1$-$C_4$), $N^+$($C_1$-$C_4$)$_2$, NHCO, $NHCH_2CONH$, a nitrogen heterocycle, a cationic nitrogen heterocycle, and absent. In certain embodiments, X is selected from a group consisting of NH, $NCH_3$, $N^+(CH_3)_2$, NHCO, $NHCH_2CONH$, pyrrolidine, imidazolidine, imidazole, imidazolium, pyrazolidine, pyrazole, pyrazolium, piperazine, and piperazinium. In one embodiment, X is imidazolium.

In general, in accordance with embodiments, Y is selected from a group consisting of $C_1$-$C_8$ unsubstituted alkyl, $C_1$-$C_8$ substituted alkyl, substituted aromatic, and absent. In certain embodiments, Y is selected from a group consisting of $CH_2$, $CH_2CH_2$, $CHFCH_2$, CHFCHF, $CF_2CH_2$, $CF_2CF_2$, $CH_2CHCH_3CH_2$, $H_2C(CH_3)_2CH_2$, $CH_2OCH_2$, $CH_2OCH_2OCH_2$, $CH_2OCH_2OCH_2OCH_2$, $OCH_2CH_2O$, $OCH_2CH_2OCH_2CH_2O$, $C_6H_4$, $C_6H_2F_2$, $C_6F_4$, $C_6H_4CH_2NHC_6H_4$, $CH_2CONHC_6H_4$, and absent. In one embodiment, Y is $CH_2CH_2$.

Generally, Z is selected from a group consisting of substituted aromatic, $C_1$-$C_{12}$ unsubstituted alkyl, and $C_1$-$C_{12}$ substituted alkyl. In certain embodiments, Z is selected from a group consisting of $C_5H_{11}$, $C_6H_{13}$, $C_7H_{15}$, $C_8H_{17}$, $C_9H_{19}$, $C_6F_{13}$, $C_7F_{15}$, $C_8F_{17}$, $C_9F_{19}$, $C_6F_5$, $C_6H_4$—$C_6H_5$, $C_6H_4$—$C_6F_5$, and $C_6F_4$—$C_6F_5$. In one embodiment, Z is $C_8F_{17}$. In another embodiment, Z is $C_8H_{17}$.

In one embodiment, W is $CH_2CH_2CH_2$; X is imidazolium; Y is $CH_2CH_2$; and Z is $C_8F_{17}$ as shown in the compound of Formula (II):

Formula (II)

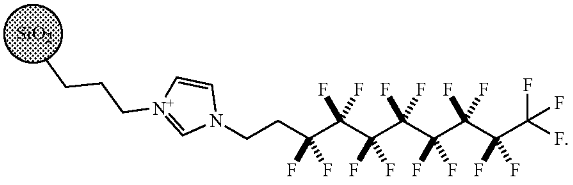

In another embodiment, W is $CH_2CH_2CH_2$; X is imidazolium; Y is absent; and Z is $C_8H_{17}$ as shown in the compound of Formula (III):

Formula (III)

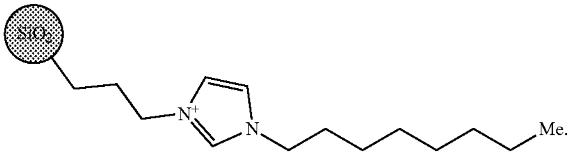

The compound of Formula (I) comprises $SiO_2$ having a particle size ranging from about 35 μm to about 70 μm. In various embodiments, the compound of Formula (I) comprises $SiO_2$ having a particle size such as about 35 μm, about 36 μm, about 37 μm, about 38 μm, about 39 μm, about 40 μm, about 41 μm, about 42 m, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 m, about 60 μm, about 61 μm, about 62 μm, about 63 μm, about 64 μm, about 65 μm, about 66 μm, about 67 μm, about 68 μm, about 69 μm, or about 70 μm. In various embodiments, the compound of Formula (I) comprises $SiO_2$ having a particle size ranging from about 37 μm to about 70 μm, from about 35 μm to about 40 μm from about 40 μm to about 45 μm, from about 45 μm to about 50 μm, from about 50 μm to about 55 μm, from about 55 μm to about 60 μm, from about 60 μm to about 65 μm, from about 65 μm to about 70 μm, from about 35 μm to about 55 μm, or from about 50 μm to about 70 μm.

The compound of Formula (I) comprises $SiO_2$ having a surface area ranging from about 400 $m^2/g$ to about 700 $m^2/g$. In various embodiments, compound of Formula (I) comprises $SiO_2$ having a surface area such as about 00 $m^2/g$, about 450 $m^2/g$, about 500 $m^2/g$, about 550 $m^2/g$, about 600 $m^2/g$, about 650 $m^2/g$, or about 700 $m^2/g$. In various embodiments, compound of Formula (I) comprises $SiO_2$ having a surface area ranging from about 400 $m^2/g$ to about 700 $m^2/g$, from about 400 $m^2/g$ to about 450 $m^2/g$, from about 450 $m^2/g$ to about 500 $m^2/g$, from about 500 $m^2/g$ to about 550 $m^2/g$, from about 550 $m^2/g$ to about 600 $m^2/g$, from about 600 $m^2/g$ to about 650, or from about 650 $m^2/g$ to about 700 $m^2/g$.

(II) Methods of Preparing the Compound of Formula (I)

Another aspect of the present disclosure encompasses methods of preparing the compound of Formula (I). The methods comprise: a) contacting chloro W-functionalized silica ($SiO_2$) with a compound of Formula (IV), or contacting amino W-functionalized silica ($SiO_2$) with a compound of Formula (V) forming a mixture:

X—Y—Z Formula (IV);

LG-Y—Z Formula (V)

in the presence of a solvent forming the compound of Formula (I); and b) optionally contacting the mixture from step a) with an unsubstituted $C_1$-$C_4$ alkyl iodide in the presence of a solvent:

wherein:

W is selected from a group consisting of $C_1$-$C_8$ unsubstituted alkyl and $C_1$-$C_8$ substituted alkyl;

X is selected from the group consisting of NH, N($C_1$-$C_4$), $N^+(C_1$-$C_4)_2$, NHCO, $NHCH_2CONH$, a nitrogen heterocycle, a cationic nitrogen heterocycle, and absent;

Y is selected from a group consisting of $C_1$-$C_8$ unsubstituted alkyl, $C_1$-$C_8$ substituted alkyl, substituted aromatic, and absent;

Z is selected from the group consisting of substituted aromatic, $C_1$-$C_{12}$ unsubstituted alkyl, and $C_1$-$C_{12}$ substituted alkyl; and LG is selected from a group consisting of Cl, Br, I, OTf, and OMs.

In general, in accordance with embodiments, W is selected from a group consisting of $C_1$-$C_8$ unsubstituted alkyl and $C_1$-$C_8$ substituted alky. In certain embodiments, W is selected from a group consisting of $CH_2$, $CH_2CH_2$, $CH_2CH(CH_3)CH_2$, $CH_2CH_2CH_2$, $CH_2CH_2CH_2CH_2$, $CH_2CH_2CH_2CH_2CH_2$, and $CH_2CH_2CH_2CH_2CH_2CH_2$. In one embodiment, W is $CH_2CH_2CH_2$.

Generally, in accordance with embodiments, X is selected from the group consisting of NH, N($C_1$-$C_4$), $N^+(C_1$-$C_4)_2$, NHCO, $NHCH_2CONH$, a nitrogen heterocycle, a cationic nitrogen heterocycle, and absent. In certain embodiments, X is selected from a group consisting of NH, $NCH_3$, $N^+(CH_3)_2$, NHCO, $NHCH_2CONH$, pyrrolidine, imidazolidine, imidazole, imidazolium, pyrazolidine, pyrazole, pyrazolium, piperazine, and piperazinium. In one embodiment, X is imidazolium.

In general, in accordance with embodiments, Y is selected from a group consisting of $C_1$-$C_8$ unsubstituted alkyl, $C_1$-$C_8$ substituted alkyl, substituted aromatic, and absent. In certain embodiments, Y is selected from a group consisting of $CH_2$, $CH_2CH_2$, $CHFCH_2$, CHFCHF, $CF_2CH_2$, $CF_2CF_2$, $CH_2CHCH_3CH_2$, $CH_2C(CH_3)_2CH_2$, $CH_2OCH_2$, $CH_2OCH_2OCH_2$, $CH_2OCH_2OCH_2OCH_2$, $OCH_2CH_2O$, $OCH_2CH_2OCH_2CH_2O$, $C_6H_4$, $C_6H_2F_2$, $C_6F_4$, $C_6H_4CH_2NHC_6H_4$, $CH_2CONHC_6H_4$, and absent. In one embodiment, Y is $CH_2CH_2$. In another embodiment, Y is absent.

Generally, Z is selected from a group consisting of substituted aromatic, $C_1$-$C_{12}$ unsubstituted alkyl, $C_1$-$C_{12}$ substituted alkyl. In certain embodiments, Z is selected from a group consisting of $C_5H_{11}$, $C_6H_{13}$, $C_7H_{15}$, $C_8H_{17}$, $C_9H_{19}$, $C_6F_{13}$, $C_7F_{15}$, $C_8F_{17}$, $C_9F_{19}$, $C_6F_5$, $C_6H_4$—$C_6H_5$, $C_6H_4$—$C_6F_5$, and $C_6F_4$—$C_6F_5$. In one embodiment, Z is $C_8F_{17}$. In another embodiment, Z is $C_8H_{17}$.

In general, LG is selected from a group consisting of Cl, Br, I, OTf, and OMs. In one embodiment, LG is I.

In one embodiment, W is $CH_2CH_2CH_2$; X is imidazolium; Y is $CH_2CH_2$; and Z is $C_8F_{17}$ as shown in the compound of Formula (II):

Formula (II)

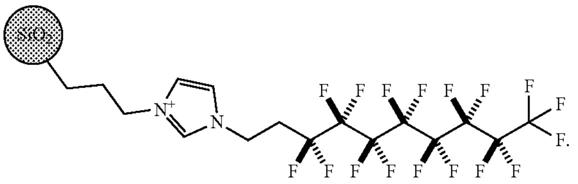

In another embodiment, W is $CH_2CH_2CH_2$; X is imidazolium; Y is absent; and Z is $C_8H_{17}$ as shown in the compound of Formula (III):

Formula (III)

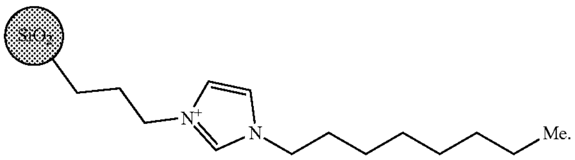

As discussed above, the first step in the method, step a), involves contacting chloro W-functionalized silica with the compound of Formula (IV) in the presence of a solvent or contacting amino W-functionalized silica with the compound of Formula (V) in the presence of a solvent forming a mixture. After work-up and isolation, the compound of Formula (I) is isolated. This method step is commonly referred to as an $S_N2$ or a nucleophilic substitution bimolecular reaction.

Chloro W-functionalized silica and amino W-functionalized silica are detailed above. In certain embodiments, W is selected from a group consisting of $CH_2$, $CH_2CH_2$, $CH_2CH(CH_3)CH_2$, $CH_2CH_2CH_2$, $CH_2CH_2CH_2CH_2$, $CH_2CH_2CH_2CH_2CH_2$, and $CH_2CH_2CH_2CH_2CH_2CH_2$. In one embodiment, W is $CH_2CH_2CH_2$.

The compound of Formula (III) is detailed above.

In certain embodiments, X is selected from a group consisting of NH, $NCH_3$, $N^+(CH_3)_2$, NHCO, $NHCH_2CONH$, pyrrolidine, imidazolidine, imidazole, imidazolium, pyrazolidine, pyrazole, pyrazolium, piperazine, and piperazinium. In one embodiment, X is imidazolium.

In certain embodiments, Y is selected from a group consisting of $CH_2$, $CH_2CH_2$, $CHFCH_2$, CHFCHF, $CF_2CH_2$, $CF_2CF_2$, $CH_2CHCH_3CH_2$, $H_2C(CH_3)_2CH_2$, $CH_2OCH_2$, $CH_2OCH_2OCH_2$, $CH_2OCH_2OCH_2OCH_2$, $OCH_2CH_2O$, $CH_2CH_2OCH_2CH_2O$, $C_6H_4$, $C_6H_2F_2$, $C_6F_4$, $C_6H_4CH_2NHC_6H_4$, $CH_2CONHC_6H_4$, and absent. In one embodiment, Y is $CH_2CH_2$. In another embodiment, Y is absent.

In certain embodiments, Z is selected from a group consisting of $C_5H_{11}$, $C_6H_{13}$, $CH_{15}$, $C_8H_{17}$, $C_9H_{19}$, $C_6F_{13}$, $C_7F_{15}$, $C_8F_{17}$, $C_9F_{19}$, $C_6F_5$, $C_6H_4$—$C_6H_5$, $C_6H_4$—$C_6F_5$, and $C_6F_4$—$C_6F_5$. In one embodiment, Z is $C_8F_{17}$. In another embodiment, Z is $C_8H_{17}$.

The compound of Formula (IV) is detailed above.

In some embodiments, LG is selected from a group consisting of Cl, Br, I, OTf, and OMs. In one embodiment, LG is I.

In certain embodiments, Y is selected from a group consisting of $CH_2$, $CH_2CH_2$, $CHFCH_2$, CHFCHF, $CF_2CH_2$, $CF_2CF_2$, $CH_2CHCH_3CH_2$, $CH_2C(CH_3)_2CH_2$, $CH_2OCH_2$, $CH_2OCH_2OCH_2$, $CH_2OCH_2OCH_2OCH_2$, $OCH_2CH_2O$, $OCH_2CH_2OCH_2CH_2O$, $C_6H_4$, $C_6H_2F_2$, $C_6F_4$, $C_6H_4CH_2NHC_6H_4$, $CH_2CONHC_6H_4$, and absent. In one embodiment, Y is $CH_2CH_2$. In another embodiment, Y is absent.

In certain embodiments, Z is selected from a group consisting of $C_5H_{11}$, $C_6H_{13}$, $C_7H_{15}$, $C_8H_{17}$, $C_9H_{19}$, $C_6F_{13}$, $C_7F_{15}$, $C_8F_{17}$, $C_9F_{19}$, $C_6F_5$, $C_6H_4$—$C_6H_5$, $C_6H_4$—$C_6F_5$, and $C_6F_4$—$C_6F_5$. In one embodiment, Z is $C_8F_{17}$. In another embodiment, Z is $C_8H_{17}$.

In general, the weight ratio of the compound of Formula (IV) to the chloro W-functionalized silica may range from about 0.5:1 to about 10:1. In various embodiments, the weight ratio of the compound of Formula (IV) to the chloro W-functionalized silica may range from about 0.5:1 to about 10:1, from about 0.5:1 to 0.75:1, from about 0.75:1 to 1:1, from about 1:1 to about 1.25:1, from about 1.25:1 to about 2:1, from about 2:1 to about 3:1, from about 3:1 to about 4:1, from about 4:1 to about 5:1, from about 5:1 to about 6:1, from about 6:1 to about 7:1, from about 7:1 to about 8:1, from about 8:1 to about 9:1, or from about 9:1 to about 10:1. In one embodiment, the weight ratio of the compound of Formula (IV) to the chloro W-functionalized silica may be about 1.1:1.

Generally, the weight ratio of the compound of Formula (V) to the amino W-functionalized silica may range from about 0.5:1 to about 10:1. In various embodiments, the weight ratio of the compound of Formula (V) to the amino W-functionalized silica may range from about 0.5:1 to about 10:1, from about 0.5:1 to 0.75:1, from about 0.75:1 to 1:1, from about 1:1 to about 1.25:1, from about 1.25:1 to about 2:1, from about 2:1 to about 3:1, from about 3:1 to about 4:1, from about 4:1 to about 5:1, from about 5:1 to about 6:1, from about 6:1 to about 7:1, from about 7:1 to about 8:1, from about 8:1 to about 9:1, or from about 9:1 to about 10:1. In one embodiment, the weight ratio of the compound of Formula (V) to the amino W-functionalized silica may be about 1.1:1.

This method step includes a solvent. As recognized by those of skill in the art, the solvent can and will vary depending on the starting substrates in the process. The solvent may be a polar protic solvent, a polar aprotic solvent, a non-polar aprotic, or combinations thereof. Suitable examples of polar protic solvents include, but are not limited to, water; alcohols such as methanol, ethanol, isopropanol, n-propanol, iso-butanol, n-butanol, s-butanol, t-butanol, and the like; diols such as propylene glycol; organic acids such as formic acid, acetic acid, and so forth; amines such as trimethylamine, or triethylamine, and the like; amides such as formamide, acetamide, and so forth; and combinations of any of the above. Non-limiting examples of suitable polar aprotic solvents include acetonitrile, dichloromethane (DCM), diethoxymethane, N,N-dimethylacetamide (DMAC), N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, 1,4-dioxane, N-methyl-2-pyrrolidinone (NMP), ethyl formate, formamide, hexamethylphosphoramide, N-methylacetamide, N-methylformamide, methylene chloride, nitrobenzene, nitromethane, propionitrile, sulfolane, tetramethylurea, tetrahydrofuran (THF), 2-methyltetrahydrofuran, trichloromethane, and combinations thereof. Suitable examples of non-polar solvents include, but are not limited to, alkane and substituted alkane solvents (including cycloalkanes), aromatic hydrocarbons, esters, ethers, combinations thereof, and the like. Specific non-polar solvents that may be employed include, for example, benzene, toluene, butyl acetate, t-butyl methyl ether, chlorobenzene, chloroform, chloromethane, cyclohexane, dichloromethane, dichloroethane, diethyl ether, ethyl acetate, diethylene glycol, fluorobenzene, heptane, hexane, isopropyl acetate, methy tetrahydrofuran, pentyl acetate, n-propyl acetate, tetrahydrofuran, toluene, and combinations thereof. In one embodiment, the solvent may be toluene or DMF.

Generally, the volume to weight ratio of the solvent to the chloro W-functionalized silica and compound comprising Formula (IV) or the amino W-functionalized silica and compound comprising Formula (V) will range from about 0.5:1 to about 100:1. In various embodiments, the volume to weight ratio of the solvent to the chloro W-functionalized silica and compound comprising Formula (IV) or the amino W-functionalized silica and compound comprising Formula (V) may range from about 0.5:1 to about 100:1, from about 2:1 to about 50:1, from about 5:1 to about 30:1, or from about 7:1 to about 10:1. In one embodiment, the volume to weight ratio of the solvent to the chloro W-functionalized silica and compound comprising Formula (IV) or the amino W-functionalized silica and compound comprising Formula (V) may be about 8:1.

In general, the method will be conducted at a temperature that ranges from about 0° C. to about 50° C. depending on the solvent utilized. In various embodiments, the temperature of the method may range from about 0° C. to about 50° C., from about 10° C. to about 40° C., or from about 15° C. to about 30° G. In one embodiment, the reaction may be conducted at temperature about ~23° C. (i.e., room temperature). The method typically is performed under ambient pressure. The method may also be conducted under an inert atmosphere, for example under nitrogen, argon, or helium.

Generally, the method is allowed to proceed for a sufficient period of time until the method is complete, as determined by any method known to one skilled in the art, such as HPLC, TLC, or proton nuclear magnetic resonance (e.g., $^{1}H$ NMR). The duration of the reaction may range from about 1 hour to about 48 hours. In various embodiments, the duration of the method may range from about 1 hour to about 48 hours, from about 2 hours to about 36 hours, or from about 16 hours to about 36 hours. In an embodiment, the reaction may be allowed to proceed for about 24 hours. In this context, a "completed reaction" generally means that the reaction mixture contains a significantly diminished amount of the compound of Formula (IV) or the compound of Formula (V). Typically, the amount of the compound of Formula (IV) or the compound of Formula (V) remaining in the reaction mixture at the end of the reaction may be less than about 10%, less than about 5%, or less than about 2%.

The method optionally comprises step b), contactin the mixture from step a) with an unsubstituted $C_1$-$C_4$ alkyl iodide in the presence of a solvent.

The mixture from step a) is detailed more above.

Step b) includes an unsubstituted $C_1$-$C_4$ alkyl iodide. Examples of the unsubstituted $C_1$-$C_4$ alkyl iodide include but not limited to, methyl iodide, ethyl iodide, propyl iodide, n-propyl iodide, and n-butyl iodide. In one embodiment, the unsubstituted $C_1$-$C_4$ alkyl iodide comprises methyl iodide.

Generally, the weight ratio of the unsubstituted $C_1$-$C_4$ alkyl iodide to the compound of Formula (I) may range from about 1:1 to about 10:1. In various embodiments, the weight ratio of the unsubstituted $C_1$-$C_4$ alkyl iodide to the compound of Formula (I) may range from about from about 1:1 to about 1.25:1, from about 1.25:1 to about 2:1, from about 2:1 to about 3:1, from about 3:1 to about 4:1, from about 4:1 to about 5:1, from about 5:1 to about 6:1, from about 6:1 to about 7:1, from about 7:1 to about 8:1, from about 8:1 to about 9:1, or from about 9:1 to about 10:1. In one embodiment, the weight ratio of the unsubstituted $C_1$-$C_4$ alkyl iodide to the compound of Formula (I) may range from about 1:1 to about 5:1.

This method step includes a solvent. As recognized by those of skill in the art, the solvent can and will vary depending on the starting substrates in the process. The solvent may be a polar protic solvent, a polar aprotic solvent, a non-polar aprotic, or combinations thereof. Suitable examples of polar protic solvents include, but are not limited to, water; alcohols such as methanol, ethanol, isopropanol, n-propanol, iso-butanol, n-butanol, s-butanol, t-butanol, and the like; diols such a propylene glycol; organic acids such as formic acid, acetic acid, and so forth; amin s such as trimethylamine, or triethylamine, and the like; amides such as for amide, acetamide, and so forth; and combinations of any of the above. Non-limiting examples of suitable polar aprotic solvents include acetonitrile, dichloromethane (DCM), diethoxymethane, N,N-dimethylacetamide (DMAC), N,N-dimethylformamide (DMF), dimethyl sulfoxide (DMSO), N,N-dimethylpropionamide, 1,3-dimethyl-3,4,5,6-tetrahydro-2(1H)-pyrimidinone (DMPU), 1,3-dimethyl-2-imidazolidinone (DMI), 1,2-dimethoxyethane (DME), dimethoxymethane, bis(2-methoxyethyl)ether, 1,4-dioxane, N-methyl-2-pyrrolidinone (NMP), ethyl formate, formamide, hexamethylphosphoramide, N-methylacetamide, N-methylformamide, methylene chloride, nitrobenzene, nitromethane, propionitrile, sulfolane, tetramethylurea, tetrahydrofuran (THF), 2-methyltetrahydrofuran, trichloromethane, and combinations thereof. Suitable examples of non-polar solvents include, but are not limited to, alkane and substituted alkane solvents (including cycloalkanes), aromatic hydrocarbons, esters, ethers, combinations thereof, and the like. Specific non-polar solvents that may be employed include, f r example, benzene, toluene, butyl acetate, t-butyl methyl ether, chlorobenzene, chloroform, chloromethane, cyclohexane, dichloromethane, dichloroethane, diethyl ether, ethyl acetate, diethylene glycol, fluorobenzene, heptane, hexane, isopropyl acetate, methyltetrahydrofuran, pentyl acetate, n-propyl acetate, tetrahydrofuran, toluene, and combinations thereof. In one embodiment, the solvent may be DMF.

Generally, the volume to weight ratio to the unsubstituted $C_1$-$C_4$ alkyl iodide to the compound of Formula (I) will range from about 0.5:1 to about 100:1. In various embodiments, the volume to weight ratio of the solvent to the unsubstituted $C_1$-$C_4$ alkyl iodide may range from about 0.5:1 to about 100:1, from bout 2:1 to about 50:1, from about 5:1 to about 30:1, or from about 7:1 to about 10:1. In one embodiment, the volume to weight ratio of the solvent to the unsubstituted $C_1$-$C_4$ alkyl iodide may range from about 1:1 to about 2:1.

In general, the method will be conducted at a temperature that ranges from about 0° C. to about 50° C. In various embodiments, the temperature of the method may range from about 0° C. to about 50° C., from about 10° C. to about 40° C., or from about 15° C. to about 30° C. In one embodiment, the reaction may be conducted at temperature about ~23° C. (i.e., room temperature). The method typically is performed under ambient pressure. The method may also be conducted un er an inert atmosphere, for example under nitrogen, argon, or helium.

Generally, the method is allowed to proceed for a sufficient period of time until the method is complete, as determined by any method know to one skilled in the art, such as HPLC, TLC, or proton nuclear magnetic resonance (e.g., $^1$H NMR). The duration of the reaction may range from about 1 hour to about 48 hours. In various embodiments, the duration of the method may range from about 1 hour to about 48 hours, from about 2 hours to about 36 hours, or from about 16 hours to about 36 hours. In an embodiment, the reaction may be allowed to proceed for about 24 hours. In this context, a "completed reaction" generally means that the reaction mixture contains a significantly diminished amount of the compound of Formula (I). Typically, the amount of the compound of Formula (I) remaining in the reaction mixture at the end of the reaction may be less than about 10%, less than about 5%, or less than about 2%.

The compound comprising Formula (I) may have a yield of at least about 50%. In various embodiments, the compound comprising Formula (I) may have a yield of at least about 50%, at least about 60%, at least about 70%, at least about 75%, at least about 80%, at least about 85%, at least about 90%, at least about 95%, or at least about 99%. In one embodiment, compound comprising Formula (I) may have a yield of about 50%.

In general, the purity of the compound of Formula (II may be at least 90%. In various embodiments, the purity of the compound of Formula (I) may be at least 90%, at least 91%, at least 92%, at least 93%, at least 94%, at least 95%, at least 96%, at least 97%, at least 98%, or at least 99%.

(III) Methods of Removing PFAS from a PFAS Contaminated Water Supply

Another aspect of the present disclosure encompasses methods of removing PFAS contaminate from a PFAS contaminated water supply. The method comprises contacting the PFAS contaminated water supply with the compound of Formula (I). The compound of Formula (I) may sequester, withdraw, or bind the PFAS contaminate from a PFAS contaminated water supply. This method reduces the PFAS contaminate concentration from the PFAS contaminated water supply.

The Compound of Formula (I)

The compound of Formula (I) is described in more detail above on Section (I).

PFAS Contaminated Water Supply

PFAS contaminated water supply comprises PFAS contaminated ground water, PFAS contaminated well water, PFAS contaminated municipal water, PFAS contaminated river water, PFAS contaminated lake water, or a combination thereof. Each of these water supplies may be contaminated with ppb (par per billion) or ppt (parts per trillion) levels of PFAS contaminate.

The PFAS contaminate in these PFAS contaminate water supplies may comprise perfluorobutanoic acid (PFBA), perfluorobutane sulfonic acid (PFBS), perfluorodecanoic acid (PFDA), perfluoroheptane sulfonic acid (PFHpS), perfluorododecanoic acid (PFDoA), perfluoroheptanoic acid (PFHpA), perfluorohexane sulfonic acid (PFHxS), perfluorohexanoic acid (PFHxA), perfluorononanoic acid (PFNA), perfluorooctanoic acid (PFOA), n-perfluorooctanoic acid (n-PFOA), branched perfluorooctanoic acid (Sb-PFOA), perfluorooctane sulfonic acid (PFOS), n-perfluorooctane sulfonic acid (n-PFOS), branched perfluoromethylheptane sulfonic acid (Sm-PFOS), perfluorooctane sulfonamide (PFOSA or FOSA), perfluoropentanoic acid (PFPeA), perfluoroundecanoic acid (PUFA or PFUnDA), 2-(N-ethyl-perfluorooctane sulfonamido) acetic acid (EtFOSAA), 2-(N-methyl-perfluorooctane sulfonamido) acetic acid (Me-PFOSA-AcOH or Me-FOSA-A), 9-chlorohexadecafluoro 3-oxanonane-1-sulfonic acid (9Cl-PF3ONS), Adona (4,8-dioxa-3H-perfluorononanoate), GenX (2,3,3,3-tetrafluoro-2-(1,1,2,2,3,3,3-heptafluoropropoxy)-propanoic acid (HFPO-DA)), or combinations thereof. In one embodiment, PFAS contaminate in these PFAS contaminated water supplies may comprise perfluorohexane sulfonate (PFHxS), perfluorooctane sulfonate (PFOS), perfluorohexanoic acid (PFHxA), perfluorobutanoic acid (PFBA), pefluorooctanoic acid (PFOA), perfluorobutanesulfonic acid (PFBS), perfluoroheptanoic acid (PFHpA), pefluorononanoic acid (PFNA), perfluorodecanoic acid (PFDA), or combinations thereof.

The amounts of the PFAS contaminate in these PFAS contaminated water supplies can and will vary depending on the geographic position of the water supply, the proximity of the initial PFAS contamination, the industry using a FAS, the specific PFAS contaminant, the amount of PFAS contamination, the amount of precipitation, the texture of the soil, etc.

Contacting the Compound of Formula (I) and the PFAS Contaminated Water Supply

The method comprises contacting the compound of Formula (I) with the PFAS contaminated water supply. To improve the efficiency of the reduction or withdrawal of the PFAS contaminate in the PFAS contaminated PFAS contaminated water supply, the compound of Formula (I) and the PFAS contaminate in the PFAS contaminated water supply may be stirred (such as magnetic or mechanical), vortexed, or the compound of Formula (I) may be placed in a column where the PFAS contaminated water supply is passed over the compound of Formula (I). With the particle size ranging from about 35 μm to about 70 μm and a surface area ranging from about 400 $m^2/g$ to about 700 $m^2/g$, mixing or improving interaction with the PFAS contaminated water and the compound of Formula (I) may improve the reduction in concentration or withdrawal of the PFAS contaminate from the PFAS contaminated water supply.

Reduction of PFAS Contaminate from the PFAS Contaminated Water Supply.

The reduction of the concentration of the PFAS contaminate from the PFAS contaminated water supply may be at least about 90%. In various embodiments, the reduction of the concentration of the PFAS contaminate from the PFAS contaminated water supply may be at least about 90%, at least about 91%, at least 92%, at least 93%, at least 94%, at least 95%, at least 96%, at least 97%, at least 98%, or at least 99%.

(IV) Methods of Regeneration of the Compound of Formula (I) from the PFAS Bound Compound of Formula (I).

Another aspect of the present disclosure encompasses methods of regenerating the compound of Formula (I) from the PFAS bound compound of Formula (I). The method comprises: a) washing the PFAS bound compound of Formula (I) with different concentrations of an aqueous solvent, an organic solvent, different mixtures of an organic/different concentrations of an aqueous solvent mixture, or a combination thereof forming the compound of Formula (I); b) washing the compound of Formula (I) from step (a) with water; and c) drying the compound of Formula (I) from step b).

a) Washing the PFAS Bound Compound of Formula (I) with Different Concentrations of an Aqueous Solvent, an Organic Solvent, Different Mixtures of an Organic/Different Concentrations of an Aqueous Solvent Mixture or a Combination Thereof Forming the Compound of Formula (I)

The first step in the method, step a), comprises washing the PFAS bound compound of Formula (I) with different concentrations of an aqueous solvent, an organic solvent, different mixtures of an organic/different concentrations of an aqueous solvent mixture, or a combination thereof forming the compound of Formula (I). The aqueous solvent, the organic solvent, the organic/aqueous solvent mixture are described in more detail below. The order is described in more detail below.

The washing of the PFAS bound compound of Formula (I) may be conducted using various washing methods known in the art such as gravity washing, washing using vacuum filtration, or centrifugation. In one embodiment, the washing uses washing under vacuum filtration.

Aqueous Solvents

A wide variety of aqueous solvents may be used in washing the PFAS bound compound of Formula (I). The concentration of the aqueous solvents can and will vary depending on the salt or detergent used and the temperature of aqueous solution. These aqueous solvents may have varying concentrations from dilute (1 mM) to saturated such as 0.001 M (moles/L), 0.1 M, 0.5 M, 1.0 M, 2.0 M, 3.0 M, 4.0 M, 5.0 M, 6.0 M, 7.0 M, 8.0 M, to saturated. Non-limiting examples of the solvents may be saline, sodium acetate, potassium acetate, ammonium acetate, sodium chloride, potassium chloride, ammonium chloride, ammonium sulfate, sodium sulfate, sodium phosphate, ammonium phosphate, phosphate buffered saline, 10% Dawn™ detergent, and combinations thereof. In one embodiment, the aqueous solvent comprises ammonium acetate and phosphate buffered saline.

Organic Solvents

A wide variety of organic solvents may be used in ashing the PFAS bound compound of Formula (I). The organic solvent may be a polar protic solvent, a polar aprotic solvent, a non-polar solvent, or a combination thereof. The traces of the organic solvent may be easily removed by heating the compound of Formula (I) above the solvents boiling point, under reduced pressure, or a combination thereof. In one embodiment, the organic solvent may be a polar protic solvent such as methanol, ethanol, iso-propanol, and water.

Different Mixtures of an Organic/Different Concentrations of an Aqueous Solvent Mixture, or a Combination Thereof Forming the Compound of Formula (I)

A wide variety of different mixtures of an organic/different concentrations of an aqueous solvent mixture may be used in washing the PFAS bound compound of Formula (I). The organic portion of the mixture may be a polar protic solvent, a polar aprotic solvent, or combinations thereof. The aqueous portion of the mixture may an aqueous solvent detail above having varying concentrating varying concentrations from dilute (0.1 M) to saturated such as 0.01 M (moles/L), 0.5 M, 1.0 IV, 2.0 M, 3.0 M, 4.0 M, 5.0 M, 6.0 M, 7.0 M, 8.0 M, to saturated. Non-limiting examples of the organic/aqueous solvent mixtures may be saturated ethanolic brine (EB); ethanol/phosphate buffer saline/2 mM ammonium acetate (8:1:1, EPN) solution; ethanol/phosphate buffer saline (1:1, EP) solution; methanol:phosphate buffer Saline (1:1, MP) solution; ethanol:phosphate buffer Saline (1:3 EP) solution, and ethanol:phosphate buffer Saline (3:1 EP) solution. In one embodiment, the various concentrations of an organic/aqueous solvent mixture may be saturated ethanolic brine (EB).

Order of Washing of the PFAS Bound Compound of Formula (I)

The order of washing the PFAS bound compound of Formula (I) to produce the compound of Formula (I) can and will vary depending on the compound of Formula (I) and the PFAS bound to the compound of Formula (I). Generally, the order of washings of the PFAS bound compound of Formula (I) comprises washing with an aqueous solvent, an organic solvent, different mixtures of an organic/different concentrations of an aqueous solvent mixture, or a combination thereof in any sequential order. In one embodiment, the PFAS bound compound of Formula (I) may be washed with different mixtures of an organic/different concentrations of an aqueous solvent mixture such as saturated ethanolic brine (EB).

Generally, the washing of the PFAS bound compound of Formula (I) may occur at least 3 times. In various embodiments, the washing of the PFAS bound compound of Formula (I) may occur at least 3 times, at least 4 times, at least 5 times, or more than 5 times. In one embodiment, washing of the PFAS bound compound of Formula (I) may occur 5 times.

After each washing of the PFAS bound compound of Formula (I), the filtrate and remaining PFAS bound compound of Formula (I) are analyzed by LC/MS. This measurement allows the skilled artisan to accurately determine the amount of PFAS contaminate removed from the PFAS bound compound of Formula (I) and the amount of PFAS contaminate still bound in the compound of Formula (I).

In general, the temperature of washing the PFAS b und compound of Formula (I) may range from 10° C. to about 40° C. In various embodiments, the temperature of washing the PFAS bound compound of Formula (I) may range from about 10° C. to about 20° C., from about 20° C. to about 30° C., or from about 30° C. to about 40° C. In one embodiment, the temperature of washing the PFAS contaminated compound of Formula (I) may be about 23° C. (i.e., room temperature).

Generally, the volume to weight ratio of the different mixtures of an organic/different concentrations of an aqueous solvent mixture to the PFAS bound compound of Formula (I) may range from about 1:1 to 100:1. In various embodiments, the volume to weight ratio of the different mixtures of an organic/different concentrations of an aqueous solvent mixture to the PFAS bound compound of Formula (I) may range from about 1:1 to about 25:1, from about 25:1 to about 50:1, from about 50:1 to about 75:1, or from about 75:1 to about 100:1.

b) Washing the Compound of Formula (I) from Step (a) with Water

The next step in the method, step b), comprises washing the compound of Formula (I) from step (a) with water. In this step, residual amounts of the aqueous solvent, the organic solvent, the organic/aqueous solvent mixture or a combination thereof are removed from the compound of Formula (I) with water.

In general, the temperature of washing the compound of Formula (I) from step a) with water may range from 10° C. to about 40° C. In various embodiments, the temperature of washing the compound of Formula (I) from step a) with water may range from about 10° C. to about 20° C., from about 20° C. to about 30° C., or from about 30° C. to about 40° C. In one embodiment, the temperature of washing the compound of Formula (I) from step a) with water may be about 23° C. (i.e., room temperature).

Generally, the volume to weight ratio of the water to the compound of Formula (I) from step a) may range from about 1:1 to 100:1. In various embodiments, the volume to weight ratio of water to the compound of Formula (I) from step a) may range from about 1:1 to about 25:1, from about 25:1 to about 50:1, from about 50:1 to about 75:1, or from about 75:1 to about 100:1.

c) Drying the Compound of Formula (I) from Step b)

The last step in the method, step c), comprises drying the compound of Formula (I) from step b).

In general, the temperature of drying the compound of Formula (I) from step b) may range from 40° C. to about 80° C. In various embodiments, the temperature of drying the compound of Formula (I) from step b) may range from about 40° C. to about 60° C., from about 60° C. to about 70° C., or from about 70° C. to about 80° C. The drying of compound of Formula (I) may occur under reduced pressure (vacuum), under ambient pressure, or under a stream of an inert gas such as nitrogen, helium, or argon.

The compound comprising Formula (I) may be recovered at a yield of at least about 85%. In various embodiments, the compound comprising Formula (I) may be recovered at least about 85%, at least about 90%, or at least bout 95%. In one embodiment, the compound comprising Formula (I) may be recovered at a yield of at least about 90%.

Definitions

Unless defined otherwise, all technical and scientific terms used herein have the meaning commonly understood by a person skilled in the art to which this invention belongs.

This description will enable one skilled in the art to rake and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

Reference throughout this specification to "one embodiment," "some embodiments", "certain embodiments," "one or more embodiments," or "an embodiment" means that a particular feature, structure, material, or characteristic described in connection with the embodiment is included in at least one embodiment of the invention. Thus, the appearances of phrases containing the term "embodiment(s)" in various places throughout this specification are not necessarily referring to the same embodiment of the invention. Furthermore, the particular features structures, materials, or characteristics may be combined in any suitable manner in one or more embodiments.

In the present disclosure, "%" refers to "weight % (wt. %)" or "mass %", unless otherwise stated.

When introducing elements of the embodiments described herein, the articles "a", "an", "the" and "said" are intended to mean that there are one or more of the elements.

Concentrations, amounts, and other numerical data may be expressed or presented herein in a range format. It is to be understood that such a range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 2 to about 50" should be interpreted to include not only the explicitly recited values of 2 to 50, but also include all individual v lues and sub-ranges within the indicated range. Thus, included in this numerical range are individual values such as 2, 2.4, 3, 3.7, 4, 5.5, 10, 10.1, 14, 15, 15.98, 20, 20.13, 23, 25.06, 30, 35.1, 38.0, 40, 44, 44.6, 45, 48, and sub-ranges such as from 1-3, from 2-4, from 5-10, from 5-20, from 5-25, from 5-30, from 5-35, from 5-40, from 5-50, from 2-10, from 2-20, from 2-30, from 2-40, from 2-50, etc. This same principle applies to ranges reciting only one numerical value as a minimum or a maximum. Furthermore, such an interpretation should apply regardless of the breadth of the range, or the characteristics being described.

As used herein, the term "about" is used to provide flexibility to a numerical range endpoint by providing that a given value may be "a little above" or "a little below" the endpoint. For example, the endpoint may be within 10%, 8%, 5%, 3%, 2%, or 1% of the listed value. Further, for the sake of convenience and brevity, a numerical range of "about 50 mg/mL to about 80 mg/mL" should also be understood to provide support for the range of "50 mg/mL to 80 mg/mL." The endpoint may also be based on the variability allowed by an appropriate regulatory body, such as the FDA, USP, etc.

As various changes could be made in the above-described-methods without departing from the scope of the invention, it is intended that all matter contained in the above description and in the examples given below, shall be interpreted as illustrative and not in a limiting sense.

EXAMPLES

Materials

Flour Mop precursors, 3-aminopropyl-functionalized silica (1 mmol/g $NH_2$ loading, particle size 40-63 μm, surface area 550 $m^2/g$) and non-functionalized silica (mesh 230-400, particle size 40-63 μm) were purchased from Sigma-Aldrich and Sorbtech respectively. Experimental references GAC (Filtrasorb 400 R: reagglomerated bituminous coal, particle size 0.55-0.75 mm, surface area 1050 $m^2/g$, mesh size >mesh 5%<40 mesh 4%) and IX resin (Purolite: PFA694E particle size 0.675-0.75 mm, particle density 1.05 g/mL) were gifted by Calgon Carbon Corporation and Purolite company respectively. PAC derived from coconut shell activated carbon powder of mesh 325 (45 μm particle size) was purchased from chemicalstore.com. All chemicals were used as purchased unless otherwise stated. 1-lodo-1H, 1H, H,2H-perfluorodecane and imidazole were purchased from Oakwood. 3-Chloro-pyropyltriethoxysilane was purchased from TCI. Triethylamine was purchased from Sigma Aldrich, distilled, and stored over KOH pellets. Toluene and ethyl acetate were purchased from Fischer Chemical and stored over molecular sieves. Polypropylene centrifuge tubes were purchased from VWR. PFAS were purchased from Sigma Aldrich. Perfluorooctanesulfonic acid was purchased as the potassium salt, and perfluorooctanoic acid and perfluorobutanoic acid were purchased neat.

Analytical $^1H$ NMR and $^{19}F$ NMR spectra were collected in $CDCl_3$ or d6-acetone, using a Bruker Advance 400 MHz.

Thermogravimetric experiments were performed using the PerkinElmer Thermogravimetric Analyzer (TGA4000) instrument and ceramic crucibles. The materials were analyzed under gas purge (19.8 mL/min) with a starting temperature of 30° C. and a ramp rate of 10° C./min to 800° C. The FT-IR measurements were performed on Nicolet iS50 in the range of 525-4000 $cm^{-1}$. Shimadzu LC-20AD high performance liquid chromatograph and a Shimadzu LCMS-2010 V single stage quadrupole mass spectrometer was used. The mobile phases A and B consisted of 2 mM ammonium acetate in HPLC grade water and HPLC grade methanol respectively. Samples were injected manually at 5 μL volumes and were loaded onto a column Atlantis dC18-column- (100 Å, 5 μm, 2.1-mm×150-mm) equipped with guard column (100 Å, 5 μm, 2.1-mm×5 mm) with a flow rate of 0.15 mL/min. The LC gradient method was set as stated here: initial conditions started with 30% B and were raised to 45% at 6 min, then ramped to 80% B at 26 min, increased to 100% B at 30 min and held at 100% for 34 min, and finally decreased to 30% B at 38 min and equilibrated until 42 min.

Adsorbent Characterization for each Fluoromop (FM) material were verified by FT-IR and TGA which are reported in the SI. Precursor compounds were verified by NMR.

Adsorption Experiments

PFAS-impacted groundwater was collected from two different wells at Altus AFB located at 100 Inez Blvd, Altus, OK 73521, USA (WL016 and WL005) in polypropylene containers and stored at 0-4° C. until treatment.

Sampling guidance issued by Water Boards was followed during sample collection. A steel bailer was used to collect the groundwater. In between sites, the bailer was decontaminated with methanol, deionized water, and then dried using paper towels. Field blank, equipment blank and trip blank samples were also collected. A complete assessment of the water quality (i.e. total organic contents, or total ion count) was not performed, but water collected at two separate sites showed significant differences in their solubilities upon addition of methanol, suggesting that their chemical makeup is different. Also, differences in the well waters' pH were observed, with WL005 having a pH between 7 and 7.4, and WL016 only ranging from 7 t 7.2, confirming different ionic compositions.

For sorbent-sorbent comparisons, unless otherwise noted, the same amount (by mass) of sorbents were treated with the same volume of groundwater, excluding the control samples which lacked sorbent; controls were produced in duplicate, and experimental samples produced in triplicate. The samples were then vortexed for 10 s, shaken for two hours at 35 rpm on an orbital shaker, centrifuged at 35,000 rpm for 10 min 5 mL of supernatant were drawn and diluted to half using 5 mL methanol. The diluted sample (total volume 10 mL) was filtered through a 0.45 μm nylon membrane syringe filter with the first 7 mL of filtrate being discarded to saturate the filter, while the remainder was collected and analyzed via LC-MS.

For FIG. 1, 10 mg of sorbent was treated with 50 mL WL016 water (264 ug/L PFOA, 781 ug/L, 124 ug/L PFBA). For FIG. 1, WL005 data, 5 mg of FM adsorbents and 20 mg of GAC and IX resins were incubated in 50 mL WL005 water (245 ug/L PFOA, 1765 ug/L PFOS, 297 ug/L PFBA).

For FIG. 1, WL016 data, 10 mg FM adsorbents, and 10 mg GAC, IX resin, and PAC were incubated separately with 50 mL WL016 water.

Statical Analysis

Margins of error in reported data are two standard deviations from the reported value. Where the reported value is calculated from measured values (e.g. % Removal), the reported value is calculated from the means of the measured values. The standard deviation of the calculated value is determined using the truncated Taylor Series Approximation for variance of a function of multiple variables, i.e.

$$\sigma[f(X)]=\sqrt{\Sigma(f_{x_i}(E[X])\sigma[x_i])^2}$$

Where $f_{x_i}$ is the partial derivative of f with respect to variable $x_i$, E[X] is the mean value of the input vector X, and $\sigma[x_i]$ is the standard deviation of variable $x_i$.

Analytical Measurements:

The collected groundwater samples were analyzed by LC-MS (SIM mode) to detect PFAS both before and after treatment with sorbent materials. Solid phase extraction, which is part of the EPA 537.1 method for PFAS analysis, was not used as it was deemed excessive given the frequent and relative comparisons that were needed. An external calibration curve was used to determine PFOA, PFOS and PFBA (perfluorobutanoic acid) concentration using linear regression. The performance was assessed by percentage removal of PFAS which was calculated by subtracting amount of PFAS detected in the parallel control sample (no adsorbent) and the treated sample and divided by amount of PFAS detected in the control sample. The experiments were performed in triplicate, and their averages were used in the calculations. Calibration curves of PFOA and PFOS were obtained by serial dilution of standard solution in methanol (100 μg/mL of PFOA and PFOS purchased from Sigma Aldrich) in triplicate and can be viewed in the FIG. 2. Calibration curves of PFOA and PFOS were obtained in a range of 2000 μg/L to 62.5 μg/L in 1:1 methanol/DI water (V/V). Analytical PFBA in 25 mg ampule was purchased from Sigma Aldrich which was used to build its calibration curve. Calibration solutions were prepared in triplicate. Calibration curves were obtained using the average of triplicate. During LC MS measurement, the performance of the instrument was routinely checked using the standard's response and the blanks before and after the run. The deviation for standard was found to be under 30% across the whole period of use Example 1: Preparation of FMV1

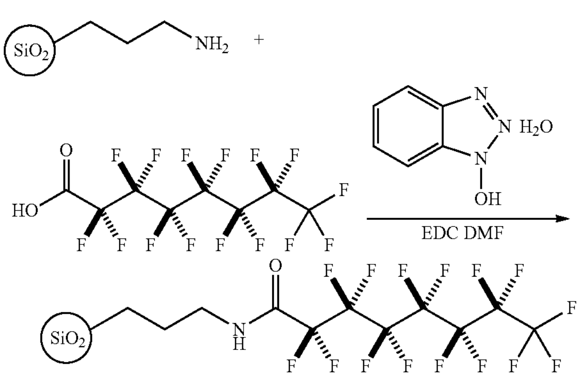

To a reaction flask, perfluorooctanoic acid (828 mg, 2 mmol) was added and dissolved in DMF (20 mL). 1-Hydroxybenzotriazole hydrate (324 mg, 2.4 mmol) and 1-ethyl-3-(dimethylaminopropyl)carbodiimide hydrochloride (EDC) (498 mg, 2.6 mmol) were added and the solution was stirred for 30 minutes at room temperature. 3-Aminopropyl-functionalized silica (1.0 g, 1 mmol), diisopropylethyl amine (929 mg, 7.19 mmol), and DMF (10 mL) were added, and the reaction was left to stir overnight at room temperature. The reaction mixture was filtered and the solid (compound of Formula (II)) was washed with copious amounts of water, methanol, and acetone.

Figure 3:
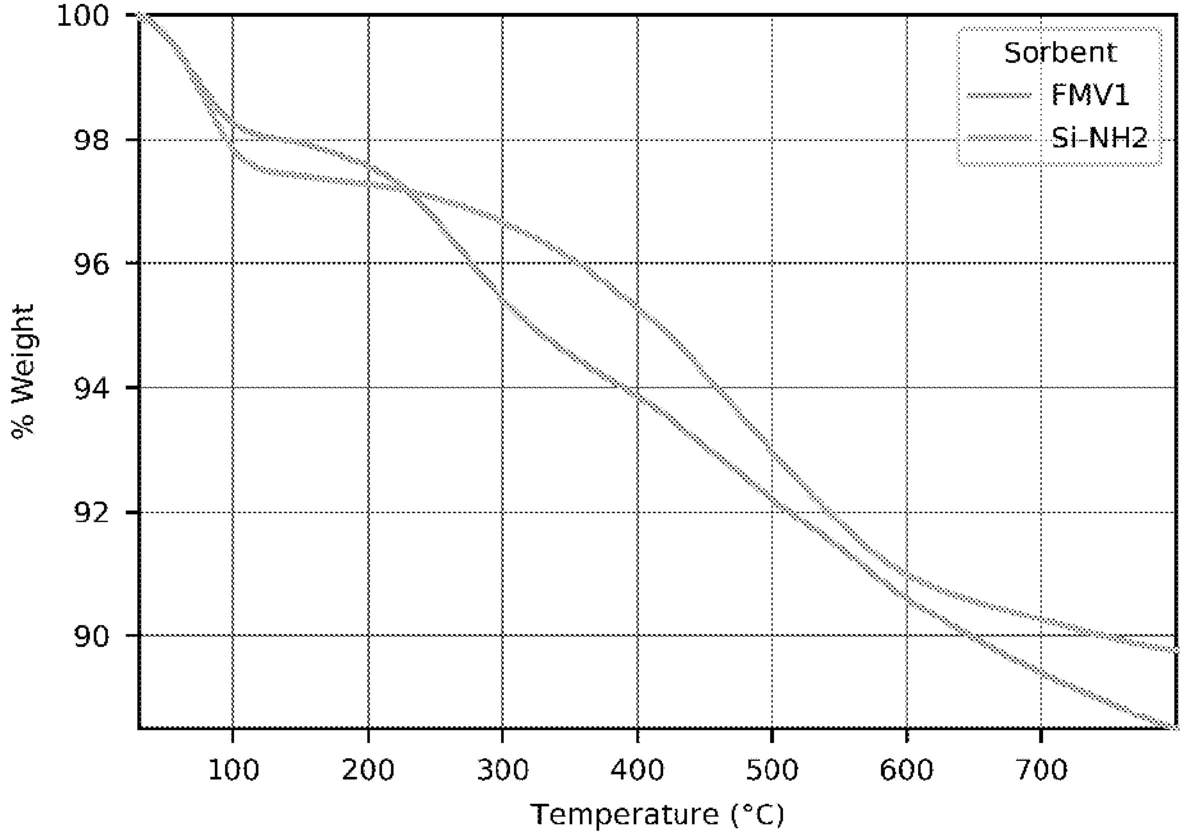
FIG. 3 is a graphical representation of TGA analysis of FMV1.

Surface functionalization was confirmed by FT-IR and TGA. FT-IR $cm^{-1}$ 1660, 1220-1170, 1130, 916, 771. At 250-650° C. weight loss was changed from 97% to 90%. Precursor silica weight loss was 96%-90% in the same temperature zone. The TGA data is shown in FIG. 3.

Example 2: Preparation of FMV2

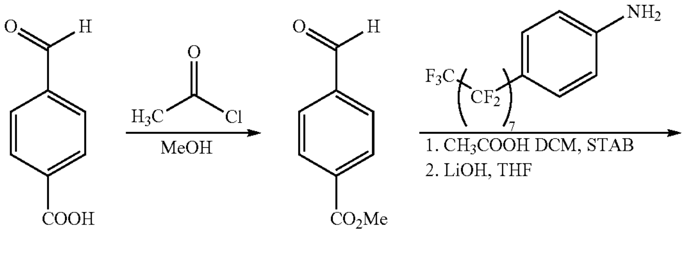

-continued

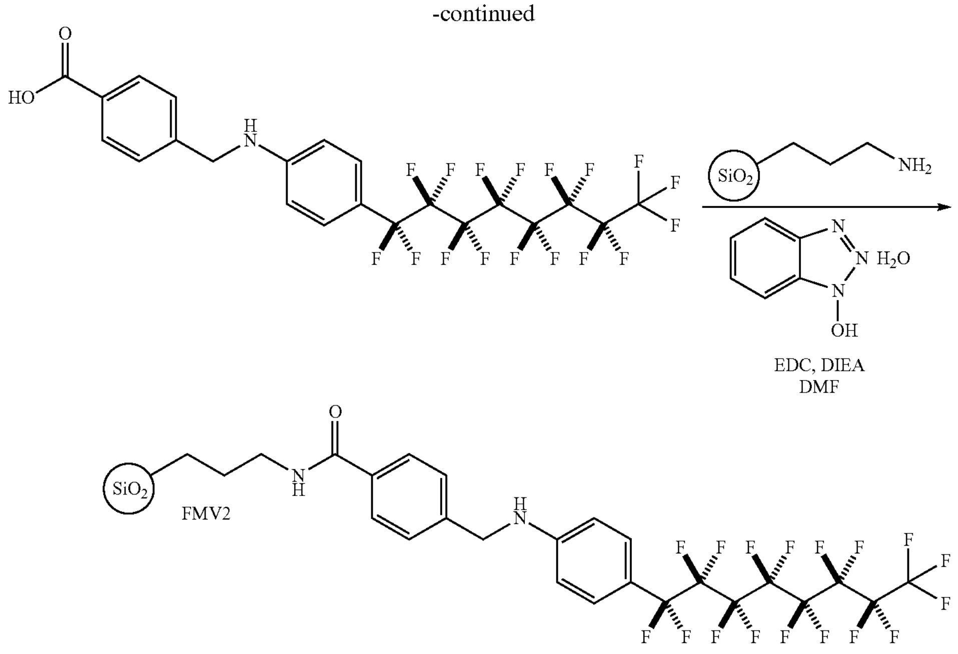

To a reaction flask, 4-formylbenzoic acid (900 mg, 6 mmol) was dissolved in methanol (18 mL) and cooled over an ice bath under an argon atmosphere. While stirring, acetyl chloride (2.3 g, 2 mL, 30 mmol) was added dropwise. After completion of addition, the ice bath was removed, and reaction was stirred at room temperature overnight. Methanol was removed via rotary evaporation to obtain a solid residue. The residue was dissolved in dichloromethane (DCM), washed twice with saturated sodium bicarbonate and brine. The organic layer was dried over magnesium sulfate, filtered, and then concentrated to methyl 4-formylbenzoate obtain white solid (986 mg, 6 mmol) in quantitative yield.

Into a reaction flask was added 4-(perfluorooctyl)aniline (5.86 g, 11.46 mmol), methyl 4-formylbenzoate (2 g, 11.46 mmol), acetic acid (2.06 g, 2 mL, 34.28 mmol), and dichloromethane (100 mL) and the mixture was stirred at rt for 3 hours. Then, sodium triacetoxyborohydride (STAB, 5 g, 23.59 mmol) was added in portions. The mixture was stirred overnight at room temperature. The reaction mixture was washed with water, twice with aqueous sat $NaHCO_3$, dried over anhydrous $MgSO_4$, filtered, and concentrated in vacuo to obtain a crude material. The crude material was purified by recrystallization in dichloromethane to obtain methyl 4-(((4-(perfluorooctyl)phenyl)amino)methyl)benzoate (4.6 g, 7.4 mmol) in 65% yield as a light greyish white solid. 4-(((4-(perfluorooctyl)phenyl)amino)methyl)benzoate (4.2 g, 6.37 mmol) was hydrolyzed by treating with LiOH (458 mg, 19.12 mmol) in THF (12 mL), and water (12 mL) at room temperature. The reaction was monitored by thin layer chromatography. If needed, more solid lithium hydroxide was add d. After removal of THF via rotary evaporation, residue was acidified to pH 3 using aqueous HCl, extracted three times with ethyl acetate, the extracts were combined, dried over anhydrous $MgSO_4$, filtered, and concentrated. The crude residue was purified by recrystallization to obtain 4-(((4-(perfluorooctyl)phenyl)amino)methyl)benzoic acid as light greyish solid (2.5 g, 3.88 mmol) in 61% yield. The product was confirmed by $^1H$ and $^{19}F$ NMR. $^1H$ NMR (400 MHz, acetone-d6) δ 8.03 (d, J=8.1 Hz, 2H), 7.56 (d, J=8.3 Hz, 2H), 7.38 (d, J=8.5 Hz, 2H), 6.83 (d, J=8.8 Hz, 2H), 4.58 (s, 2H). $^{19}F$ NMR (376 MHz, acetone-d6) δ −81.63 (t, J=10.1 Hz, 3F), −109.15 (t, J=14.6 Hz, 2F), −121.79 (m, 2F), −122.38 (b, 6F), −123.24 (b, 2F), −126.71 (m, 2F).

Into a reaction flask, 4-(((4-(perfluorooctyl)phenyl)amino)methyl)benzoic acid (2.58 g, 4 mmol), (1-ethyl-3-(dimethylaminopropyl)carbodiimide hydrochloride (EDC) (3 g, 15.6 mmol), 1-hydroxybenzotriazole hydrate (1.94 g, 14.4 mmol), and DMF (24 mL) were added and stirred for 30 min at room temperature. 3-Aminopropyl-functionalized silica (2 g, 2 mmol) and diisopropylethyl amine (1.9 g, 2.4 mL, 14.4 mmol) were then added to the reaction and the reaction was stirred overnight at room temperature. The reaction mixture was filtered and the solid 2.3 g of compound of Formula (III) was washed with copious amounts of water, methanol, acetone, and dried under vacuum. The % yield was 71%.

Figure 4:
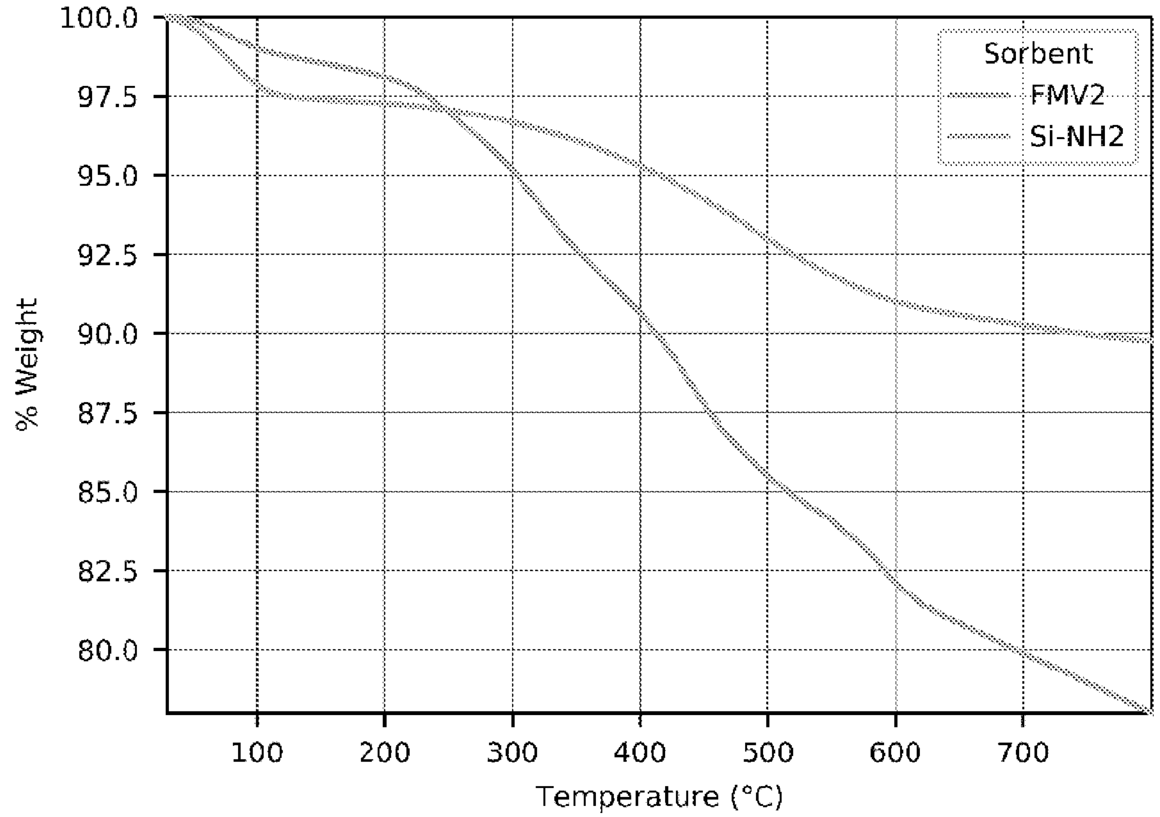
FIG. 4 is a graphical representation of TGA analysis of FMV2.

Surface functionalization confirmed by FT-IR and TGA. FT-IR $cm^{-1}$ 1616, 1530, 1191, 1043. TGA: Weight loss of 15% was observed compared to 6% wight loss of precursor silica at 250-650° C. The TGA data is shown in FIG. 4.

Example 3: Preparation of FMV3

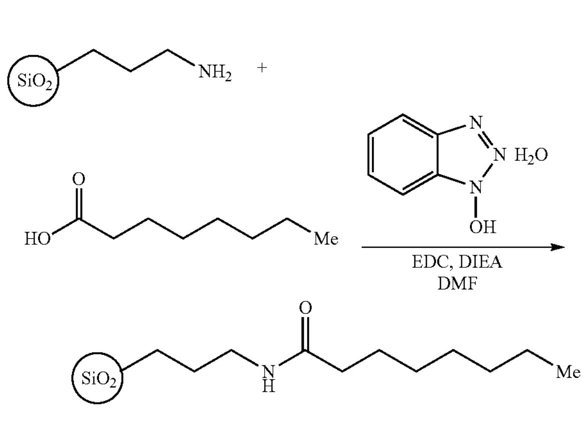

The preparation of FMV3 followed the procedure above for FMV1 as a solid except octanoic acid was used as the fluorinated reagent. 2.1 g was obtained after washing and drying in the oven under vacuum. The % yield was 92%.

Figure 5:
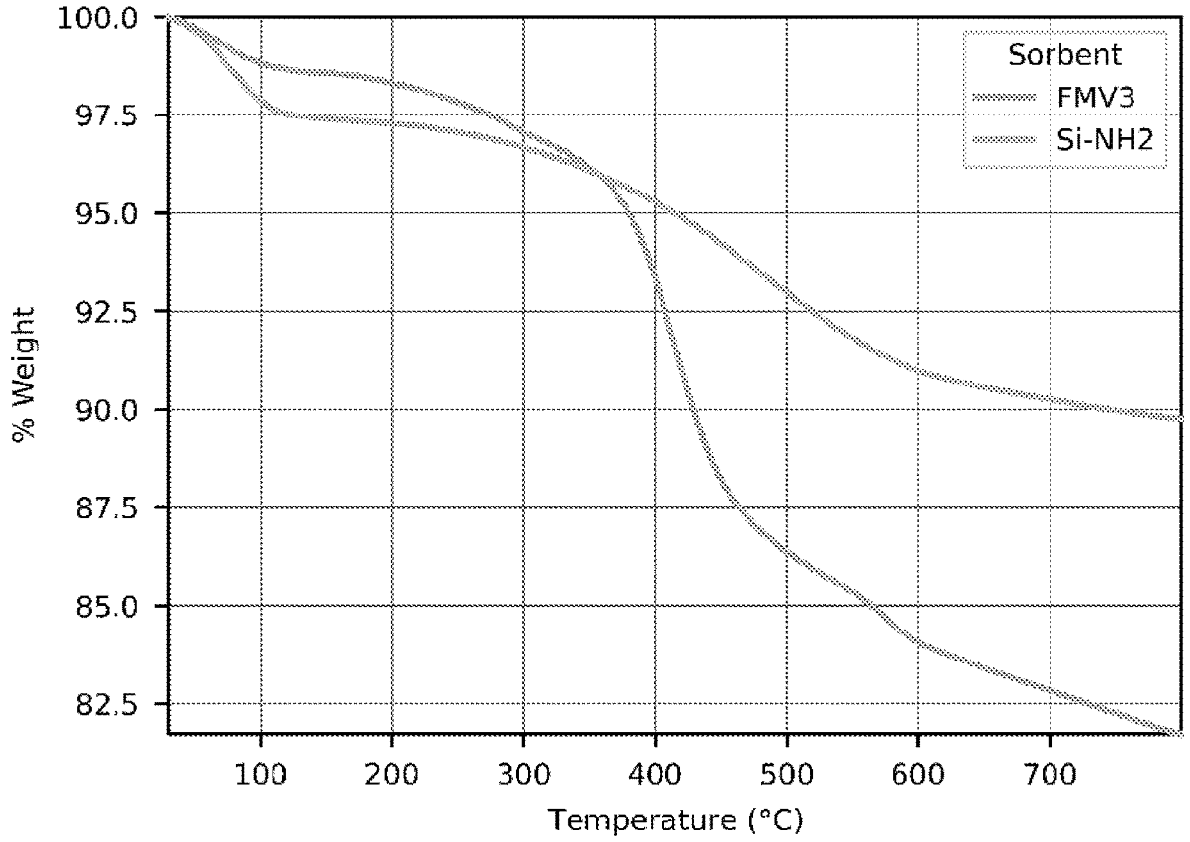
FIG. 5 is a graphical representation of TGA analysis of FMV3.

FT-IR $cm^{-1}$ 1640, 1551, 1455, 1063 $cm^{-1}$. TGA: Weight loss of 16% was observed compared to 6% wight loss of precursor silica at 250-650° C. The TGA data is shown in FIG. 5.

Example 4: Preparation of FMV4

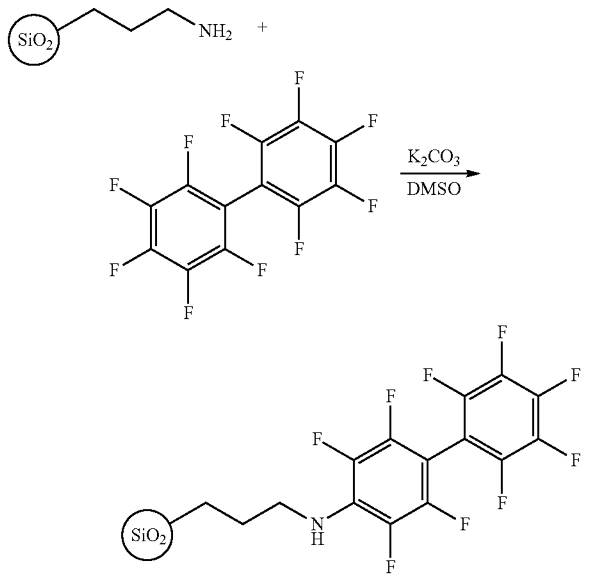

Into a reaction flask was added 3-aminopropyl-functionalized silica (1.2 g, 1.2 mmol), $K_2CO_3$ (160 mg, 1.2 mmol), decafluorobiphenyl (740 mg, 2.2 mmol), and dimethyl sulfoxide (DMSO) (5 mL) and stirred overnight under an argon atmosphere at room temperature. The reaction mixture was filtered and the solid was washed with water, dichloromethane, methanol, and acetone. The solid was dried in an oven at 85° C. under vacuum to obtain the FMV4 as a solid material. The final weight of the solid was 1.4 g and a 89% yield.

Figure 6:
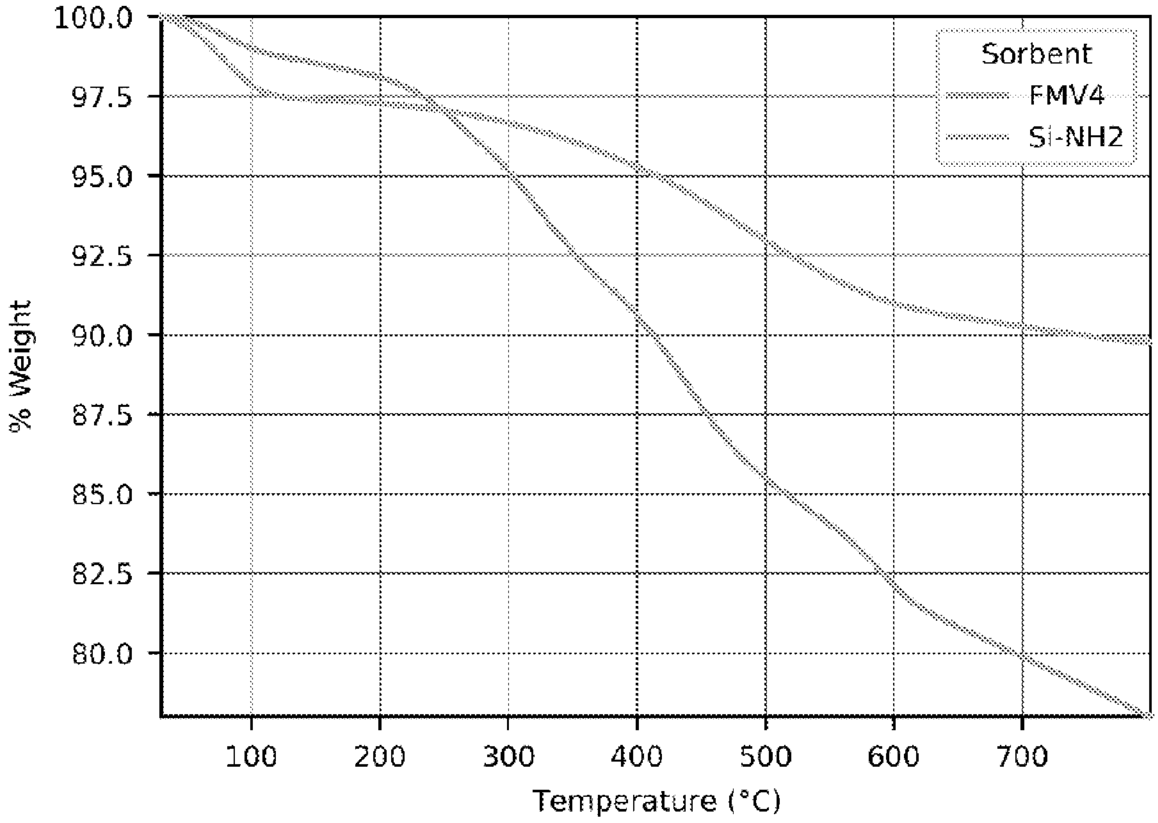
FIG. 6 is a graphical representation of TGA analysis of FMV4.

FT-IR $cm^{-1}$ 1658, 1513, 1492, 1071. TGA: Weight loss of 13% was observed compared to 6% wight loss of precursor silica at 250-650° C. The TGA data is shown in FIG. 6.

Example 5: Preparation of FMV5

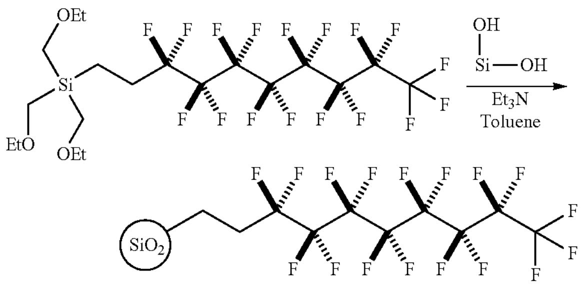

This procedure was adapted from the literature. To a reaction flask, activated silica (0.5 g, activation procedure is described under synthesis of FMV8 shown below, 1H, 1H, 2H, 2H-perfluorodecyltriethoxy silane (1 g, 0.7 mL, 1.6 mmol), toluene (5 mL), and triethylamine (3 drops) were added and refluxed overnight. The reaction mixture was cooled to room temperature, filtered, the solid was washed with toluene, methanol, water, and acetone. The solid was dried in a vacuum oven at 110° C. overnight to obtain FMV5 (0.68 g) in a 54% yield.

Figure 7:
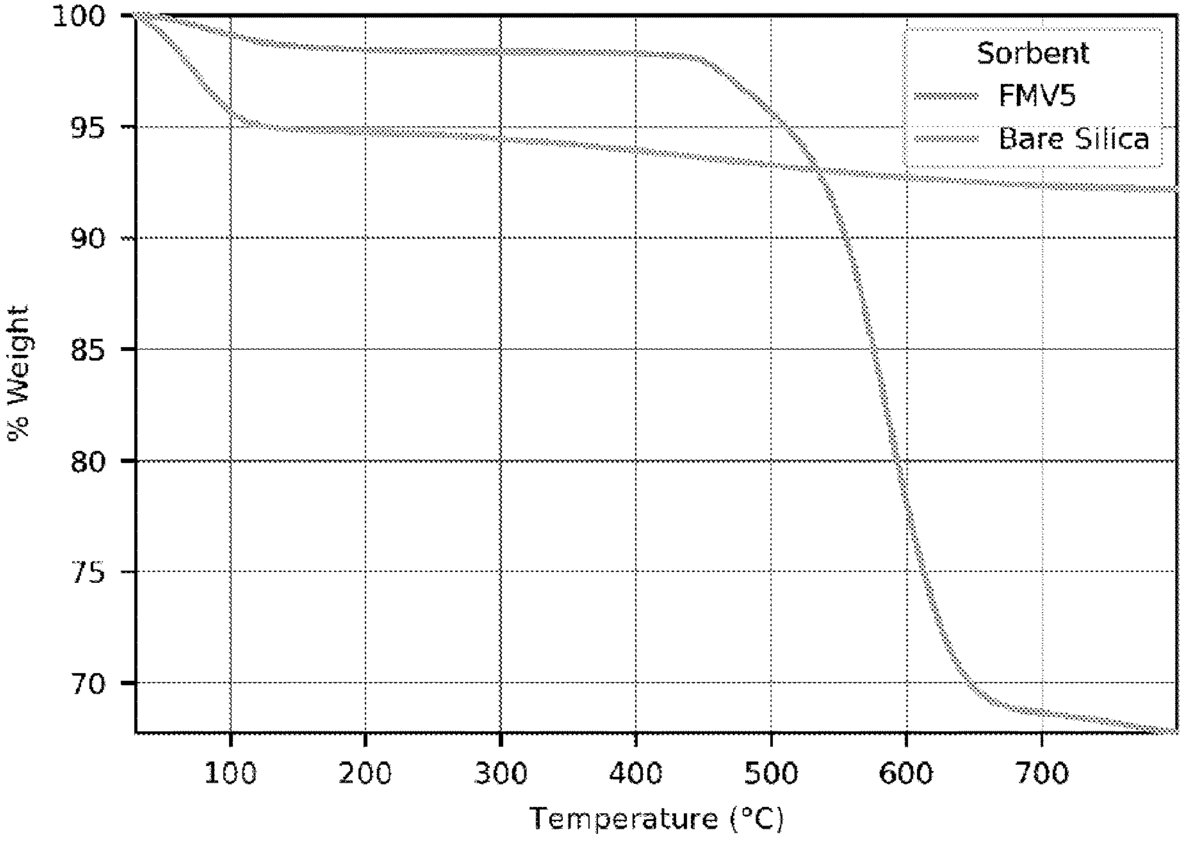
FIG. 7 is a graphical representation of TGA analysis of FMV5.

FT-IR $cm^{-1}$ 1204, 1065, 796. TGA: At 250-650° C. weight loss was 29% versus unfunctionalized silica weight loss of 2%. The TGA data is shown in FIG. 7.

Example 6: Preparation of FMV6

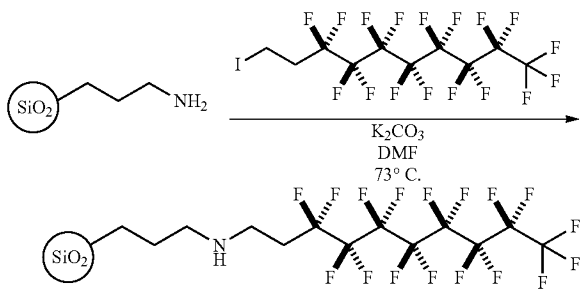

Into a reaction flask was added 3-aminopropyl-functionalized silica (500 mg), 1H, 1H,2H, 2H-perfluorodecyl iodide (862 mg, 1.5 mmol), $K_2CO_3$ (207 mg, 1.5 mmol), and dimethylformamide (DMF) (5 mL) and the mixture heated to 73-74° C. overnight under an argon atmosphere. The reaction was cooled to room temperature, diluted with water, and filtered under vacuum. The obtained solid was washed water, ethyl acetate, acetone, and dried in an oven at 60° C. for 30 min t obtain 0.43 g of FMV6 in a 60% yield.

Figure 8:
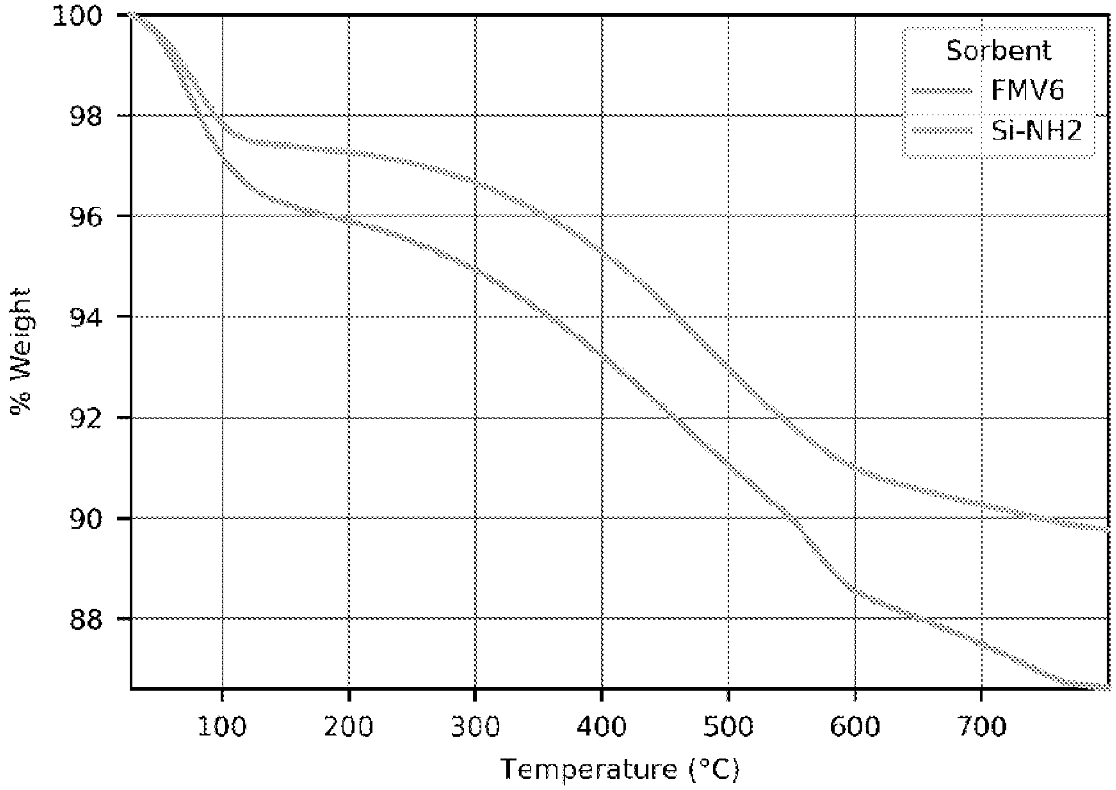
FIG. 8 is a graphical representation of TGA analysis of FMV6.

FT-IR $cm^{-1}$ 1665, 1526, 1074. TGA: Weight loss of 6% was observed compared to 6% wight loss of precursor silica at 250-650° C. The TGA data is shown in FIG. 8.

Example 7: Preparation of FMV7

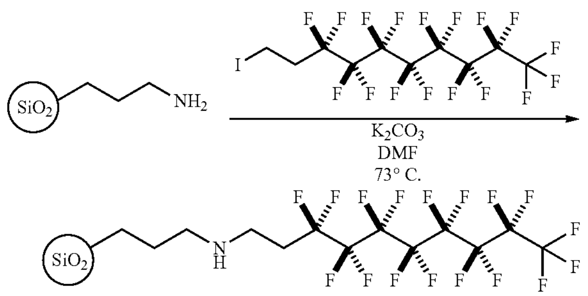

Into a reaction flask was added the FMV6 (100 mg), methyl iodide (0.5 mL), and DMF (0.5 mL) and the mixture was heated at 60° C. for 22 hours. The mixture was cooled to rt, filtered, and a solid was isolated by filtration. The solid was washed with water, ethyl acetate, methanol, and acetone. The washed solid was dried in an oven under vacuum at 60° C. for 30 min yielding FMV7 in an approximate 100% yield. FT-IR $cm^{-1}$ 1665, 1385, 1202, 1044.

Figure 9:
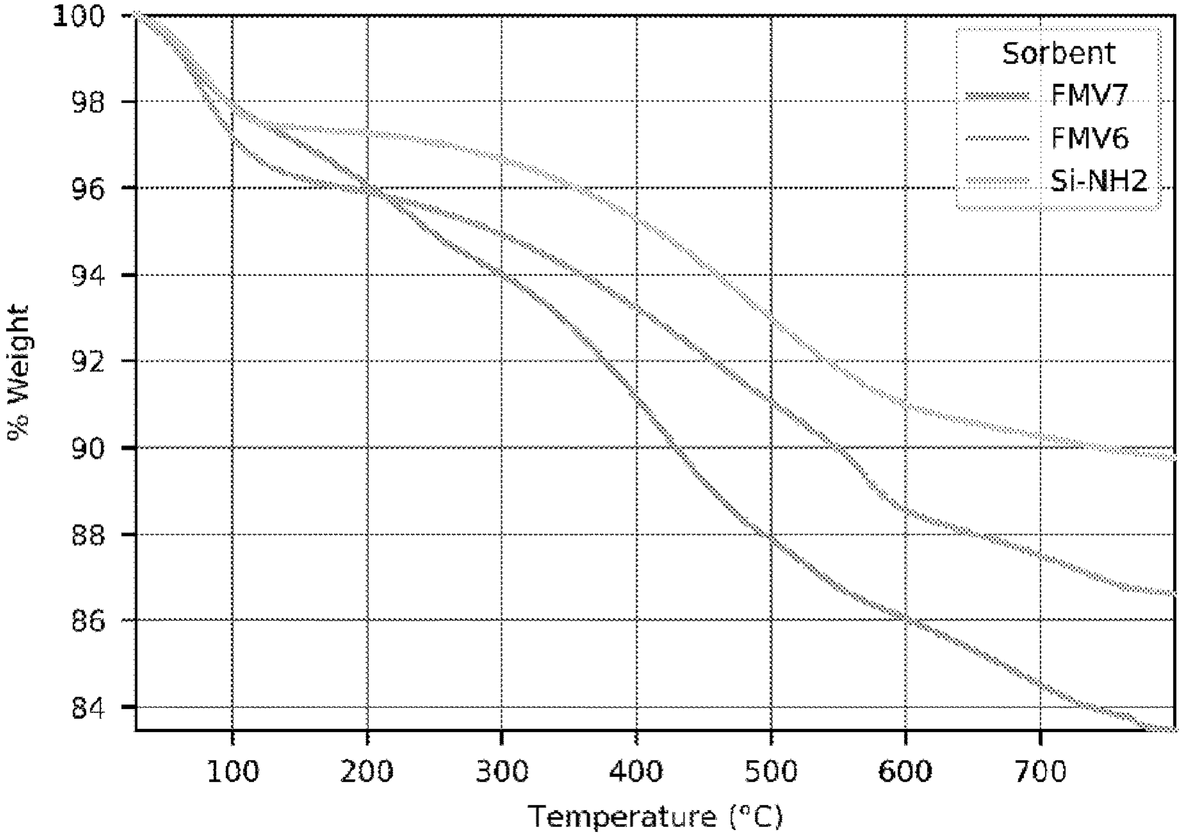
FIG. 9 is a graphical representation of TGA analysis of FMV7.

TGA: At 250-650° C. 11% weight loss observed for FMV7 compared to 15% weight loss for FMV6. The TGA data is shown in FIG. 9.

Example 8: Preparation of FMV8

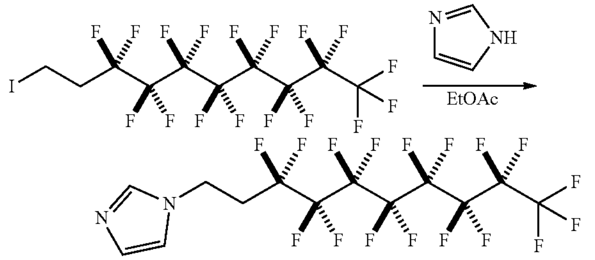

N-(3,3,4,4,5,5,6,6,7,7,8,8,9,9,10,10,10-Heptadecafluorodecyl) imidazole was synthesized according to a literature procedure. Into a reaction flask was added imidazole (296 mg, 4.35 mmol), 1-iodo-1H,1H,2H,2H-perfluorodecane (1 g, 1.74 mmol), and ethyl acetate (40 mL) and the mixture was refluxed under an argon atmosphere. The reaction was monitored by GC-MS for the disappearance of 1-iodo-1H,1H,2H,2H-perfluorodecane. After 36 h, an additional amount of imidazole (50 mg, 0.74 mmol) was added to the reaction. After the disappearance of 1-iodo-1H,1H,2H,2H-perfluorodecane, the reaction is complete. The reaction mixture was washed with water (3×30 mL), extracted with ethyl acetate to remove unreacted imidazole, dried over anhydrous $MgSO_4$, filtered, and concentrated to obtain brown residue. The brown residue was purified by recrystallization from diethyl ether to obtain orange-colored crystals of N-(3,3,4,4,5,5,6,6,7,7,8,8,9,9,10,10,10-heptadecafluorodecyl) imidazole (330 mg, 0.64 mmol) in 37% yield.

The $^{1}H$ and $^{19}F$ NMR spectra were identical to the literature values. $^{1}H$ NMR (400 MHz, chloroform-d) δ 7.57 (s, 1H), 7.13 (s, 1H), 6.97 (s, 1H), 4.36-4.28 (m, 2H), 2.61 (tt, J=17.2, 7.6 Hz, 2H). $^{19}F$ NMR (376 MHz, $CDCl_3$) δ −80.72 (t, J=10.1 Hz, 3F), −114.18 (dtd, J=21.3, 16.3, 11.3 Hz, 2F), −121.74 (m, 6F), −122.67 (m, 2F), −123.36 (d, J=15.1 Hz, 2F), −126.08 (m, 2F). GC-MS (EI), m/z 515 $[M]^{+}$.

Preparation of 3-Chlorofunctionalized Silica

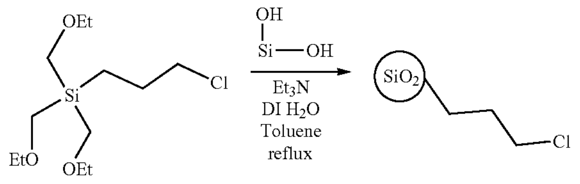

The preparation of the 3-chloro functionalized silica was followed according to the literature procedure. Silica (2.5 g) was activated by refluxing in a solution of conc. HCl (5 mL) and water (5 mL) for 5 h. The mixture was cooled to rt and filtered to obtain white solid which washed with copious amount of water and finally with acetone. The solid was dried in oven at 60° C. overnight, dried at 100° C. for 3 h, and then dried at 65° C. overnight. The activated silica was cooled to room temperature, transferred to a reaction flask containing dry toluene (30 mL). To the stirring mixture deionized water (85 μL), 3-chloropropyltriethoxysilane (2.5 mL), and triethylamine (250 μL) were added. The reaction mixture was refluxed under an argon atmosphere for 48 ours. The mixture was cooled to room temperature, filtered under vacuum, washed with toluene, an ethanol-water mixture, deionized water, and methanol. The modified silica was dried in an oven for 4 h under vacuum at 60° C. and then cooled to room temperature.

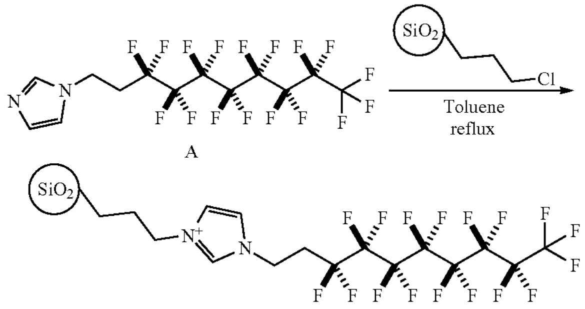

A

Into a reaction flask was added chemically bonded chloropropyl groups on the silica surface (300 mg), 1-(3,3,4,4,5,5,6,6,7,7,8,8,9,9,10,10,10-heptadecafluorodecyl), imidazole, and toluene (5 mL). The reaction mixture was refluxed under an argon atmosphere for 22 h. The mixture was cooled to rt, filtered under vacuum, and the solid washed with ethyl acetate, water-methanol (80:20 v/v), and acetone. The solid, FMV8, was dried at 60° C. overnight under vacuum yielding 0.4 g FMV8 in a 99% yield.

Figure 10:
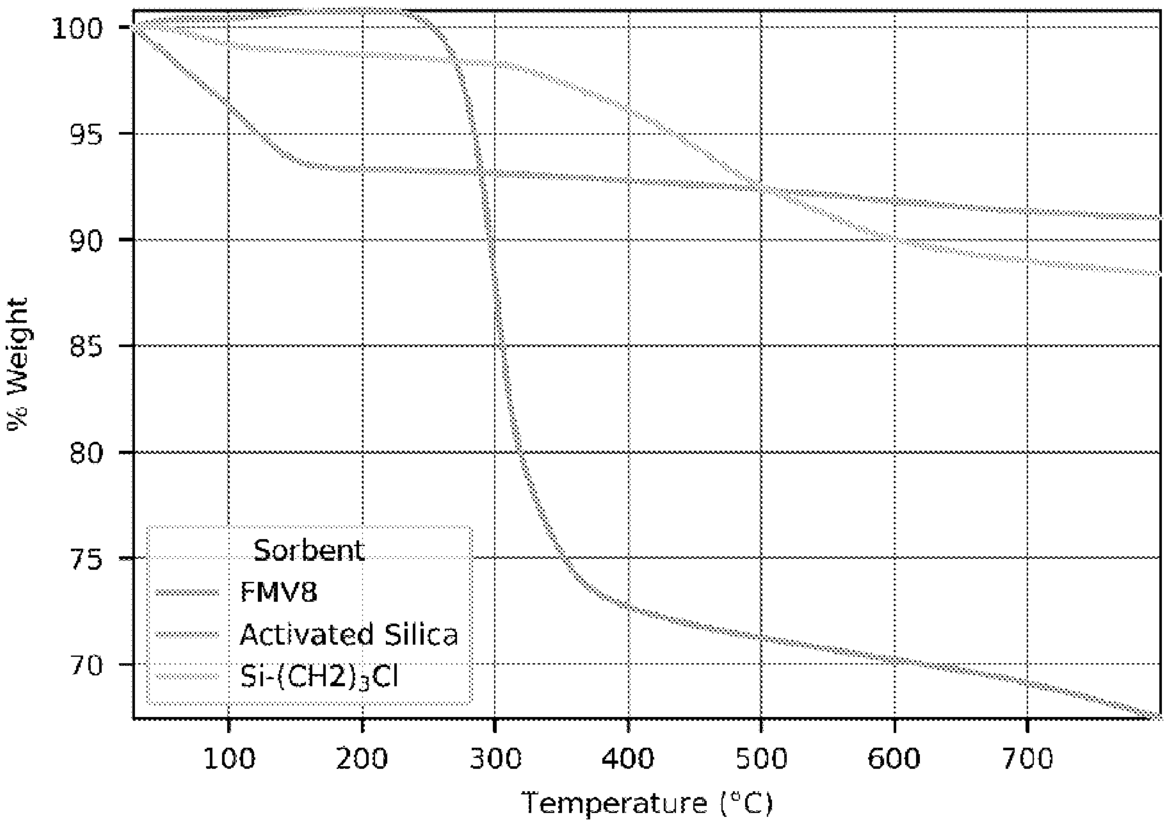
FIG. 10 is a graphical representation of TGA analysis of FMV8.

FT-IR $cm^{-1}$ 1565, 1454, 1205, 1084. TGA: The weight loss observed at 250 to 650° C. was 30% for compound of Formula (IX), 9% for chloropropyl functionalized silica, and 1% for activated silica. The TGA data is shown in FIG. 10.

Example 9: Preparation of FMV9

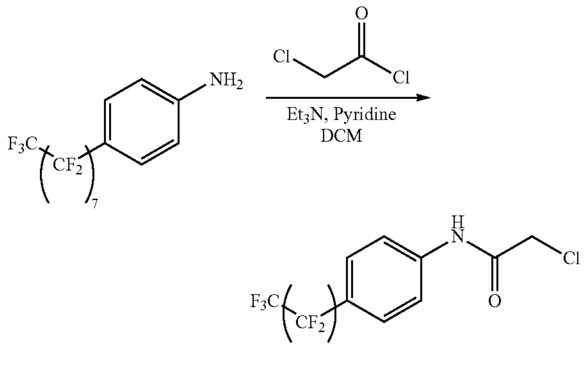

To a reaction flask was charged 4-(perfluorooctyl)aniline (2 g, 3.9 mmol), pyridine (2-3 drops), triethylamine (1.2 g, 1.6 mL, 11.7 mmol), and dichloromethane (50 mL). 2-Chloroacetyl chloride (1.3 g, 947 μL, 11.7 mmol) was then added dropwise over 10 min under argon and stirred overnight at room temperature. The reaction was diluted with water. The organic portion was separated and washed with water, brine, dried over anhydrous $MgSO_4$, filtered, and concentrated. The crude residue was purified by automated flash chromatography using hexane and ethyl acetate to obtain 2-chloro- N-(4-(perfluorooctyl)phenyl) acetamide as a colorless liquid (0.7 g, 1.2 mmol) in 31% yield.

$^1H$: NMR (400 MHz, $CDCl_3$) δ 8.37 (s, 1H), 7.74 (d, =8.6 Hz, 2H), 7.60 (d, J=8.6 Hz, 2H), 4.23 (s, 2H). $^{19}F$ NMR (376 MHz, $CDCl_3$) δ −80.73 (m, 3F), −110.43 (t, J=14.5 Hz, 2F), −121.20 (2F, b), −121.85 (6F, b), −122.68 (2F, b), −126.07 (2F, b). GC-MS (EI), m/z 578 $[M]^+$.

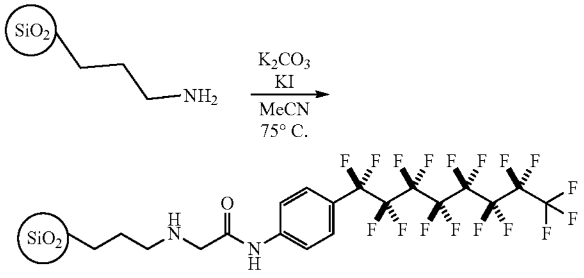

Into a reaction flask was added 3-aminopropyl-functionalized silica (500 mg, 0.5 mmol amine), 2-chloro-N-(4-(perfluorooctyl) phenyl) acetamide (434 mg, 0.75 mmol), anhydrous $K_2CO_3$ (104 mg, 0.75 mmol), catalytic amount of KI (3 mg), and dry acetonitrile (10 mL). The mixture was heated to 75-80° C. under argon atmosphere overnight. The reaction mixture was cooled to room temperature filtered, and the solid was washed with copious amounts of water, ethyl acetate, acetone, and dried under vacuum overnight.

Figure 11:
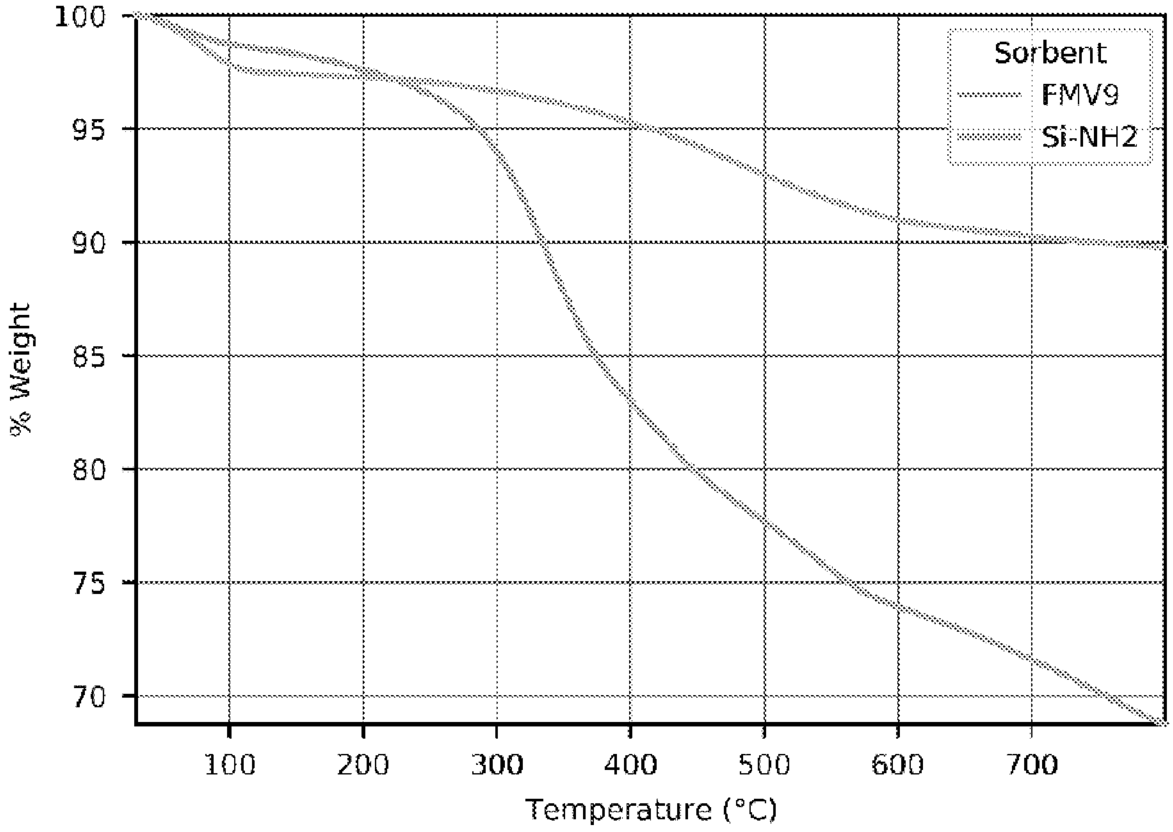
FIG. 11 is a graphical representation of TGA analysis of FMV9.

FT-IR $cm^{-1}$1664, 1613, 1540, 1414, 1202, 1151, 1065. TGA: Weight loss of 23% was observed compared to 6% wight loss of precursor silica at 250-650° C. The TGA data is shown in FIG. 11.

Example 10: Preparation of FMV10

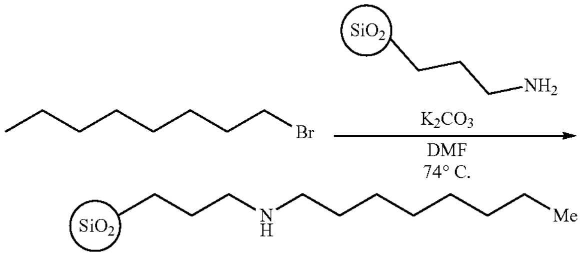

Into a reaction flask was charged with 3-aminopropyl-functionalized silica (1 g), 1-bromooctane (660 mg, 3 mmol, 600 μL), anhydrous $K_2CO_3$ (414 mg, 3 mmol), and dimethylformamide (DMF) (10 mL). The reaction mixture was heat d to 73-74° C. overnight under an argon atmosphere. The reaction was cooled to rt, diluted with water, and filtered under vacuum. The solid was washed with water, ethyl acetate, and acetone respectively, and dried over an oven at 60° C. for 30 min under vacuum yielding 0.95 g in 85% yield.

Figure 12:
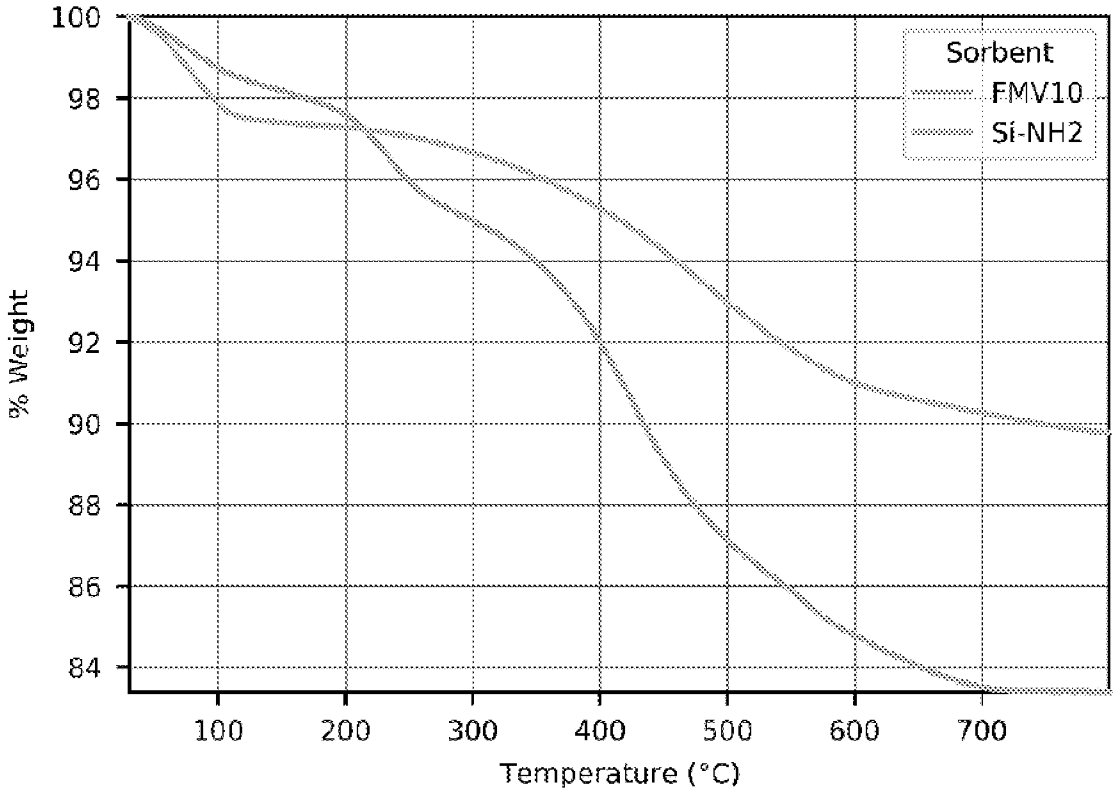
FIG. 12 is a graphical representation of TGA analysis of FMV10.

FT-IR $cm^-$1402, 1064. TGA: Weight loss of 12% was observed compared to 6% wight loss of precursor silica at 250-650° C. The TGA data is shown in FIG. 12.

Example 11: Preparation of FMV11

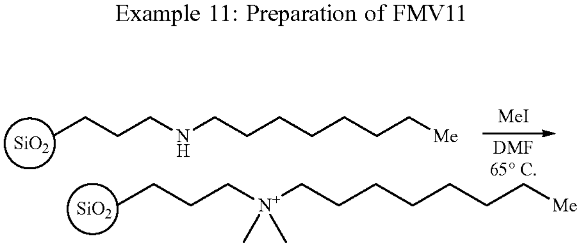

Into a reaction flask was added the compound of Formula (XI) (200 mg), methyl iodide (1 mL) and dimethylformamide (1 mL). The reaction mixture was heated at 60° C. for 22 hours. The reaction mixture was cooled to room temperature and filtered. The solid was washed with water, ethyl acetate, methanol, and acetone. The washed solid was dried in an oven 60° C. for 30 min under vacuum yielding FMV11 in an approximate 100% yield.

Figure 13:
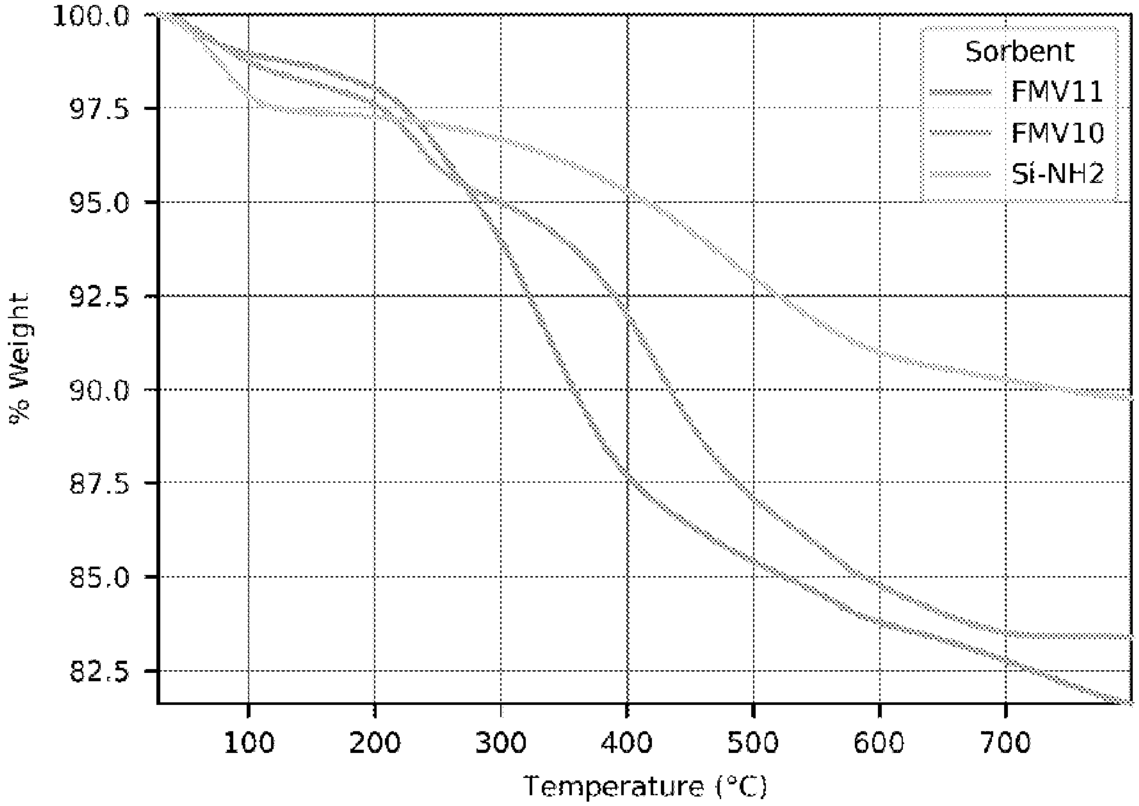
FIG. 13 is a graphical representation of TGA analysis of FMV11.

FT-IR $cm^{-1}$ 1665, 1463, 1388, 1049. TGA:13% weight loss observed compared to 12% weight loss of precursor, FMV11, at 250-650° 0. The TGA data is shown in FIG. 13.

Example 12: Preparation of FMV12

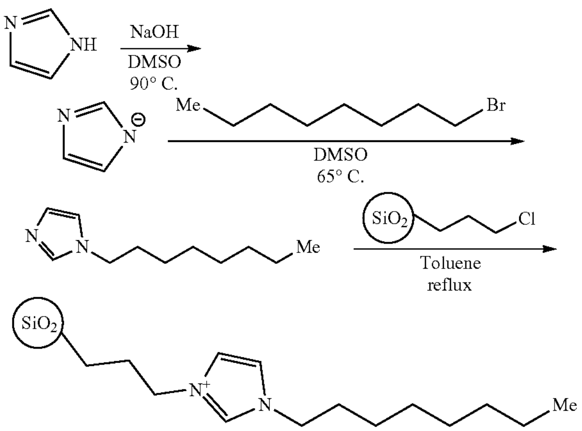

N-Octylimidazole was synthesized according to a literature procedure. Into a reaction flask was added imidazole (340 mg, 5 mmol), NaOH (200 mg, 5 mmol), and DMSO (10 mL). The reaction mixture was stirred and heated at 99° C. for 2 h. The reaction was cooled to room temperature and octyl bromide (917 mg, 0.8 mL, 4.75 mmol) was added dropwise. The reaction mixture was stirred for 3 hours at room temperature. The temperature was slowly raised to 65° C. and stirred for an additional 19 hours. The reaction mixture was cooled to rt, diluted with water, and extracted four times with diethyl ether. The combined ether extracts were dried over anhydrous $MgSO_4$, filtered, and concentrated to obtain 1-octylimidazole as a brown solid (800 mg, 4.4 mmol) in 93% yield. The NMR spectrum matched with literature values confirmed the product. $^1H$ NMR (400 MHz, chloroform-d) δ 7.46 (s, 1H), 7.06 (s, 1H), 6.91 (s, J=1.3 Hz 1H), 3.92 (t, J=7.2 Hz, 2H), 1.77 (p, J=7.1 Hz, 2H), 1.33-1.26 (m, 10H), 0.88 (t, J=6.8 Hz, 3H). The product was also confirmed by GC-MS (EI): m/z 180 $[M]^+$.

To a reaction flask, chemically bonded chloropropyl functionalized silica (800 mg), N-octylimidazole (800 mg, 4.4 mmol), and toluene (8 mL) were added and refluxed under an argon atmosphere for 41 h. The mixture was cooled to rt, filtered under vacuum, and the solid washed with ethyl acetate, water-methanol, and acetone. The solid, FMV12, was dried at 60° C. overnight under vacuum. Final weight of FMV12 was 800 mg in 89% yield.

Figure 14:
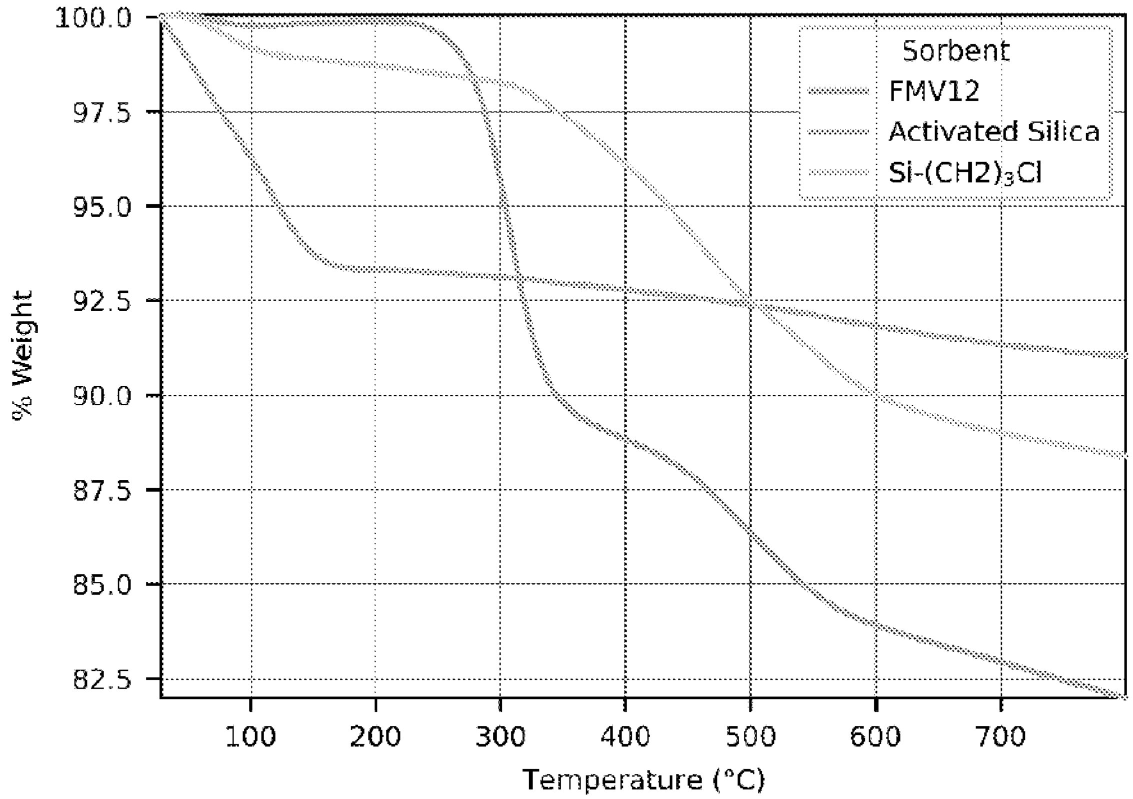
FIG. 14 is a graphical representation of TGA analysis of FMV12.

FT-IR $cm^{-1}$ 2964, 1736, 1564, 1458, 1000-1300. TGA: At 250-650° C. observed 16% weight loss compared to 9% and 1% for 1-chloropropyl functionalized silica and activated silica respectively. The TGA data is shown in FIG. 14.

Effect of pH on FMV8 Sorption

Figure 15:
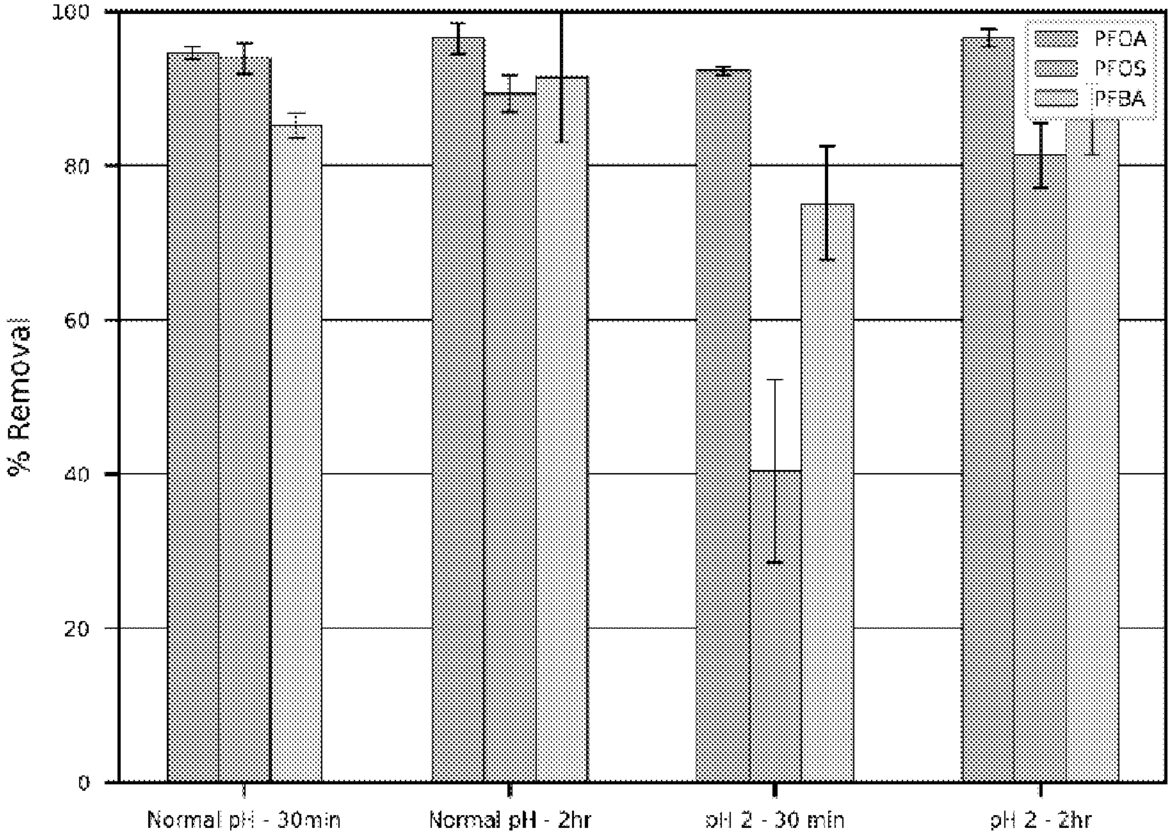
FIG. 15 is a graphical representation of a bar graph showing the fractional removal (%) of PFAS at pH 2 and neutral pH.

A stock solution of 100 mg/L PFOS, PFOA, and PFBA was prepared by adding 5.38 mg PFOS salt, 5 mg PFBA, and 5 mg PFOA to a 50 mL centrifuge tube filled with 50 mL DI water. Two 1-liter polypropylene bottles were filled with 500 mL of DI water. To one of the 1-liter polypropylene bottles, 1.25 mL of the $tock solution was added to yield a concentration of 250 ug/L. For both polypropylene bottles, 125 mL each was transferred to 4 250 mL polypropylene bottles. In half of the resulting 8 bottles (two each), 1 M HCl was added dropwise until pH 2 was reached. 50 mL was taken twice from each bottle and deposited into 50 mL centrifuge tubes, with one tube containing 10 mg FMV8. In total, each of 16 centrifuge tubes had a unique code of either spiked or not spiked, acidic or neutral treated, or untreated with sorbent, and fir t or second duplicate. The tubes were placed on a rocking platform at 100 rocks per minute for two hours. The rocking was stopped after 30 minutes and 5 mL aliquots were taken from each tube, deposited into 5 mL of methanol in 15 mL centrifuge tubes, and then vortexed for 10 seconds. 8 mL of the resulting dilutions were passed through a syringe tip filter and discarded, with the final two being filtered and collected in labelled glass vials to be analyzed by LCMS. The tubes were then rocked for another 1.5 hours, and the same preparations were made at the 2 hours mark. FIG. 15 shows the fractional removal of PFAS at different pHs.

Batch Sorption Experiment by Pace Analytical

Batch sorption was performed on selected sorbents in 50 mL centrifuge tubes. For each sorbent 6 centrifuge tubes were taken. To each tube, 30 mg sorbent and 50 mL of groundwater were added, vortexed for 10 seconds, shaken for 2 hours at 35 rpm on an orbital shaker, centrifuged at 35,000 rpm for 10 min, and the supernatant was combined, and 250 mL were transferred to a 250 mL sample bottle sent by Pace Analytical. The remaining 50 mL was maintained for internal testing at Weaver Labs. The control samples (no sorbents) were treated exactly like samples. The samples were shipped to Pace Analytical for each sorbent and control (untreated groundwater/control) for the analysis. The pH of each supernatant was measured, and the average was found to be 7.20 with a low of 7.10 and a high 7.30.

Kinetic Sorption Studies

A stock solution of 100 mg/L PFOS was prepared in 50 mL 1:1 deionized water and methanol. 10 mg each of FMV8 was weighed into 3 labelled 50 mL centrifuge tubes. The weigh paper was then rinsed with approximately 5 mL D water into the respective tube, 5 mL of water were added to a fourth tube to which no FMV8 had been added to act as a control. The tubes were filled to approximately 40 mL before 1 mL of stock solution was pipetted into each tube, and each filled was to 50 mL to final concentration of 2 mg/L. Each tube was then vortexed for 10 s and then placed onto a rocking platform set at 80 rocks per minute. At every time point, the rocking platform was stopped; 2.5 mL aliquots were taken from each tube, deposited into 2.5 mL of methanol in 15 mL centrifuge tubes, and then vortexed for 10 s. The experimental tubes were placed back on the rocker to resume rocking. 3 mL of the resulting dilutions were passed through a syringe tip filter and discarded, with the final two being filtered and collected in labelled glass vials to be analyzed by LC-MS.

Figure 16:
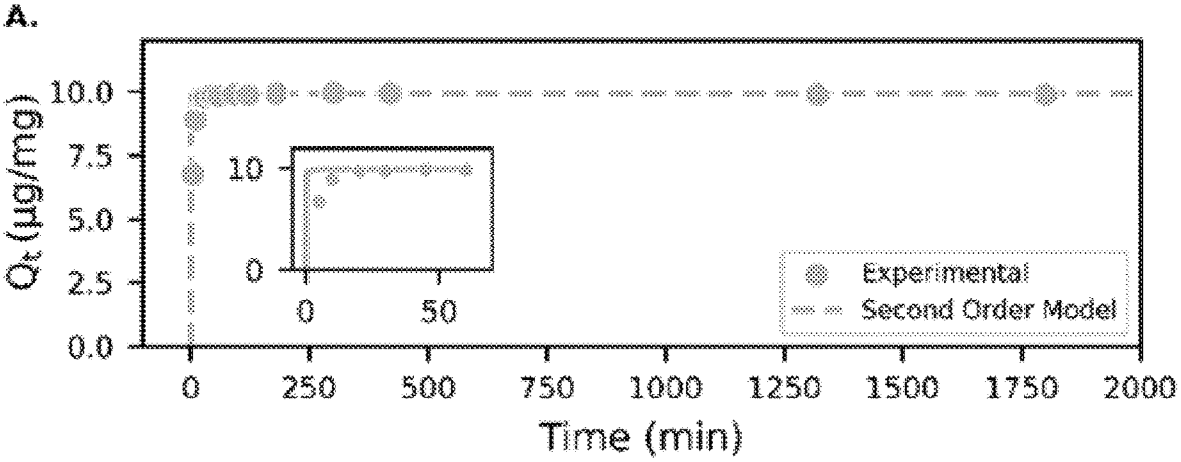
FIG. 16 is a graphical representation of the kinetics of PFOS adsorption by FMV8 $[PFOS]_0$=2000 μg $L^{-1}$ and [FMV8]=200 mg/L.
Figure 17:
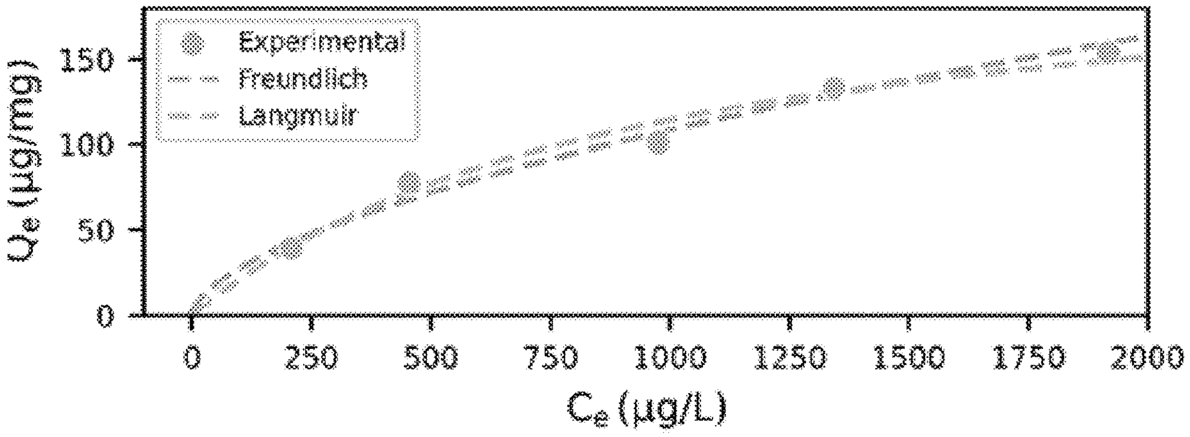
FIG. 17 is a graphical representation of PFOS adsorption isotherm by FMV8. Lines show fits to Langmuir (green) and Freundlich (blue) models. ([FMV8]=20 mg/L All experiments were run in triplicate except for the control which was run in singlet.

The kinetics of PFOS were assessed using 200 mg/L of FMV8 (FIG. 16), the same concentration used in the previous batch adsorption experiments with real-world groundwater (FIG. 1) where FMV8 performed exceptionally well. Un der these conditions FMV8 reaches equilibrium within 30 min, with k, equaling 0.429 mg $\mu g^1$ min-1 and $Q_e$, which is the adsorption capacity at equilibrium, equaling 9.91 µg $mg^{-1}$, and $R^2$ of 0.999. These rates of adsorption are best described by a pseudo-second-order model which assumes that chemical sorption controls the sorption rate, and the sorption capacity is proportional to the number of active sites on the sorbent [29]. The sorption isotherms for PFOS on FMV8 are shown in FIG. 17.

Rate of uptake as a function of the state of FMV8 using a Pseudo-Second Order model is determined by Eq. S1:

$$S1{:}Q'_t=k(Q_t-Q_e)^2$$

$Q'_t$=Time derivative of $Q_t$ (ug/mg-min)

Qt=Absorption Capacity as a function of time (ug/mg)

K=Pseudo Second Order Specific Rate

State of FMV8 as a function of time using a Pseudo-Second Order Model is determined by Eq. S2:

$$S2{:}\ Q_t=\frac{kQ_e^2t}{1+kQ_et}$$

The batch kinetics can then be described with a linearized form of S2 and used for fitting data with linear least squared regression as in Eq. S3:

$$S3{:}\ \frac{t}{Q_t}=\frac{t}{Q_e}+\frac{1}{kQ_e^2}$$

$Q_e$=Absorption Capacity at equilibrium (ug/mg)

Isotherms

A stock solution of 1 g/L PFOS was prepared in 50 m methanol. Samples were prepared in triplicate by weighing 5 mg FMV8 into 250 mL polypropylene bottles, adding 250 mL DI water, and pipetting 0.25, 0.5, 0.75, 1.0, 1.25 mL of stock to afford 1, 2, 3, 4, and 5 mg/L PFOS solutions respectively. One control for each concentration was prepared in the same manner without FMV8. The bottles were shaken thoroughly and placed onto a rocking platform at 70 rocks per minute overnight. At some point during the night, the rocking platform sustained damages and stopped rocking. 5 mL aliquots were taken from each tube, deposited into 5 mL of methanol in 15 mL centrifuge tubes, and then vortexed for 10 s 8 mL of the resulting dilutions were passed through a syringe tip filter and discarded, with the final two being filtered and collected in labelled glass vials to be analyzed by LCMS.

Langmuir absorption and Freundlich isotherms were linearized from Eq. S4 and S5 respectively $$S4{:}\ Q_e=\frac{K_LC_e}{1+K_LC_e}Q_{max}$$

$$S5{:}\ Q_e=K_FC_e^{1/n}$$

$K_L$=Langmuir equilibrium constant (L/ug)
$Q_{max}$=Theoretical maximum capacity (ug/mg)
$C_e$=Concentration of solution at equilibrium (ug/L)
$K_F$=Freundlich linear parameter, calculated for given units of $C_e$ and $Q_e$ $\frac{1}{n}$ =Freundlich exponential parameter Langmuir and Freundlich isotherm fits were generated by linear least squares regression Eq S6, S7, S8, S9, S10:

$$S6: \frac{C_e}{Q_e} = \frac{1}{Q_{max}} C_e + \frac{1}{K_L Q_{max}}$$

$$S7: \frac{1}{Q_e} = \left(\frac{1}{K_L Q_{max}}\right)\frac{1}{C_e} + \frac{1}{Q_{max}}$$

$$S8: Q_e = Q_{max} - \frac{1}{K_L}\frac{Q_e}{C_e}$$

$$S9: \frac{Q_e}{C_e} = K_L Q_{max} - K_L Q_e$$

$$S10: \ln Q_e = \frac{1}{n}\ln C_e + \ln K_F$$

$Q_e$=Adsorption Capacity at equilibrium (ug/mg)
$C_e$=Concentration of solution at equilibrium (ug/L)
$K_L$=Langmuir equilibrium constant (L/ug)
$Q_{max}$=Theoretical maximum capacity (ug/mg)
$K_F$=Freundlich linear parameter, calculated for given units of $C_e$ and $Q_e$ Isotherms are important for determining the sorbent-sorbate interactions and the sorption capacity of a material. Both the Langmuir and Freundlich models fit the adsorption isotherm, however, the Langmuir model has a slightly hi her $R^2$ (0.99 vs 0.98), and likely is the more informative model since the Freundlich model is an empirical model that can fit many different types of theoretical isotherms. Based on the Langmuir fit, the estimated capacity FMV8 is 223 μg $mg^{-1}$ (Table 2). The Langmuir model suggests that this is a homogeneous, monolayer process [2]. Additionally, it implies the binding sites are identical, there is no surface migration, and there is no interaction b tween sites.

TABLE 2

Langmuir and Freundlich Parameters Derived from FIG. 14

| Langmuir | | | Freundlich | | |
|---|---|---|---|---|---|
| $K_L\left(\frac{L}{\mu g}\right)$ | $Q_{max}\left(\frac{\mu g}{mg}\right)$ | $R^2$ | $K_F\left(\frac{ug}{mg}\right)\left(\frac{L}{ug}\right)^{\frac{1}{n}}$ | 1/n | $R^2$ |
| $1.05 \times 10^{-3}$ | 223.0 | 0.99 | 1.80 | 0.593 | 0.98 |

SAR (Structure Activity Relationship)

Fluorous phasing is a unique, highly selective, and specific noncovalent interaction observed within fluorinated moieties. This phenomenon has long been exploited in numerous applications such as purification of compounds from complex mixture, organic synthesis, immobilization of biomolecules and many more. Recent advances in sorbent technologies have introduced fluorinated component for example ionic fluorogels, fluorous filter 4603, fluorous microgel star polymers, fluorous cyclodextrin polymers to take advantage of fluorous interactions for PFAS adsorption. These technologies have shown some promising data in PFAS removal from PFAS spiked water samples. Nonetheless, these studies are at the very early stage of development with uncertainty of their performance with real-world samples, removal success with broader range of PFAS, their scalability, operation feasibility, and capital cost.

The synergistic use of hydrophobic, electrostatic, and specific fluorous interactions could be combined to drive the selective adsorption ode for PFAS to the surface of adsorbents in PFAS polluted water medium. Mesoporous silica was selected as the precursor of our sorbent materials as it possesses regular ore size with high specific surface area. The mesoporous silica is not only amenable to versatile surface modification but also has been used intensively in environmental remediation purposes. For example, ABS Materials used mesoporous silica to prepare organo-silica-based sorbents by introducing highly structured aryl-bridged units. This patented material is referred to as OsorbR. Recently, OsorbR has been formulated as PQ-OsorbR, a sorbent for PFAS remediation. Yet, more data is needed to fully evaluate PQ-OsorbR's performance. Nonetheless, PQ-OsorbR provides evidence that silica-based materials can be used for PFAS remediation. To test this hypothesis, a library of functionalized silica materials could be synthesized that probe the structure activity function relationship in efforts to remediate PFAS. Initially, 3-aminopropyl functionalized silica (particle size 40-63 μm, 1 mmol/g $NH_2$ loading, 60 Å pore size) was grafted with a perfluorooctyl unit through an amide coupling to produce our sorbent, named FMV1 (shown above). Early in our investigation, attempts to use FMV1 in PFOA/PFOS sorption experiments resulted in higher values of PFAS than should have been possible. This result was due to the apparent instability of FMV1 which may have undergone amide hydrolysis though a rigorously investigation the mechanism of breakdown. While amides are generally hydrolytically stable, the highly fluorinated amide was not stable under these conditions.

To pursue a more robust version of FMV1, an aromatic spacer was placed between the fluorous group and the silica surface. The FMV2 was synthesized (shown above). The sorbent FMV2 was characterized by FT-IR and TGA. To widen our understanding of the role of the fluorous interaction in PFAS adsorption FMV3 was designed to determine both hydrophobic and hydrogen bonding attractive features found in other commercial adsorbents but lacking any attractive fluorous element. An interesting, but less investigated question is whether other fluorinated motifs such as aryl fluorides can display useful attractive features. Thus, the FMV4 was synthesized via aromatic nucleophilic substitution (SNAr) of decafluorbiphenyl and 3-aminopropyl-functionalized silica. Successful surface modification was confirmed by the distinctive FT-IR and TGA. Next, a fluorous silica was synthesized that was devoid of the nitrogen linker, FMV5, confirmed by FT-IR and TGA.

Preliminary experiments determined that spacer of several atoms between the silica surface and the fluorinated motif is preferred. Importantly, these studies also affirmed that the precursor of the compounds of FMV1-FMV12 only removed a small fraction of the PFAS from solution (Table 3, shown below), providing strong evidence of the importance of the functionalization.

TABLE 3
| Structural Modifications of Fluor Mop Materials | |
|---|---|
| 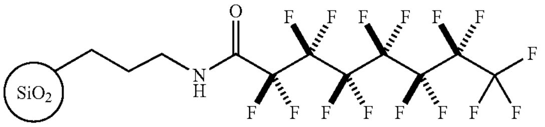 | FMV1 |
| 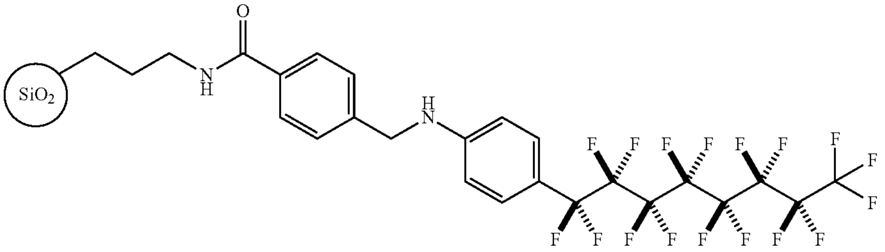 | FMV2 |
| 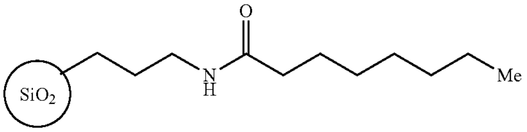 | FMV3 |
| 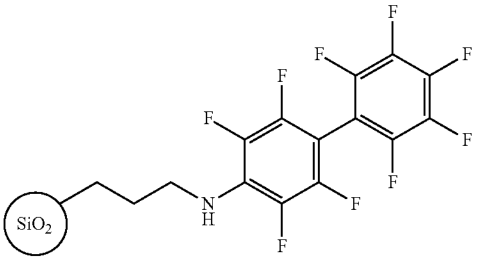 [SMILES: "SiO2" ; CCCCNc1c(F)c(F)c(-c2c(F)c(F)c(F)c(F)c2F)c(F)c1F] | FMV4 |
| 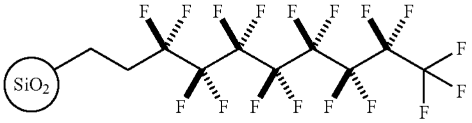 | FMV5 |
| 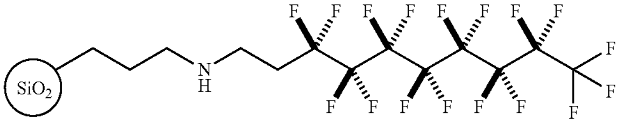 | FMV6 |
| 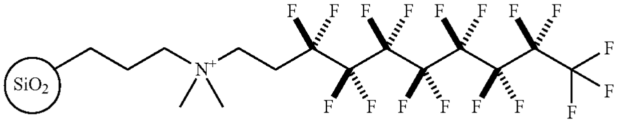 | FMV7 |
| 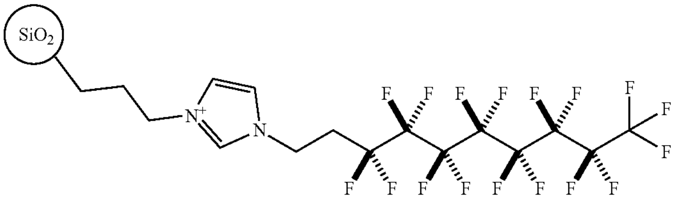 | FMV8 |
| 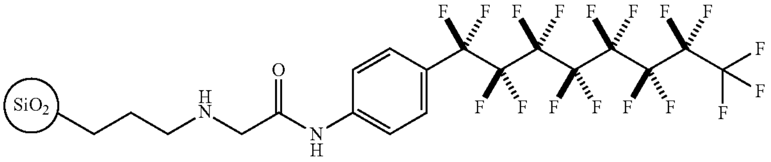 | FMV9 |

TABLE 3-continued

| Structural Modifications of Fluor Mop Materials | |
|---|---|
| 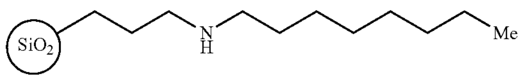 | FMV10 |
| 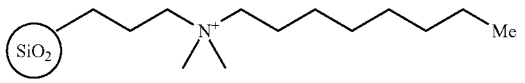 | FMV11 |
| 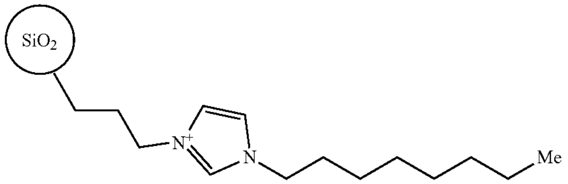 [SMILES: "SiO2" ; CCCCCCCCn1cc[n+](CCCC)c1] | FMV12 |

The surface engineering of the silica was logically executed such that each material possesses unique surface chemistry and structural configuration, and delivers a unique affinity for different PEAS. A library of Fluor Mop adsorbent materials was prepared, including compounds FMV6-FMV11, in which the perfluoroalkyl, hydrocarbon, and amine entities were varied. Furthermore, the role of surface charge of the adsorbents by incorporating both amine and permanently charged ammonium functionalities was investigated. The synthesis of FMV6, FMV7, FMV10, and FMV11 via nucleophilic substitution was accomplished using 3-aminopropyl-functionalized silica and the appropriate alkyl iodide or bromide. FMV7 and FMV11 were further reacted with iodomethane to provide a quaternized nitrogen. Surface modification was most clearly illustrated by TGA. The length of the aromatic spacer was envisioned to induce different structural configurations, and thus could impact PEAS interactions and affinity within aqueous media. The FMV9 was prepared and, while structurally similar to FMV2, FMV9 lacks the additional aromatic component and contains an mine which is expected to be more basic. The surface chemistry was confirmed by FT-IR and TGA. In another iteration of this technology, the use of the positively charged imidazolium unit to connect to the fluorinated motif. The five-membered imidazolium ring was introduced using 1-chloropropyl functionalized silica to synthesize both FMV8 and FMV12. An imidazolium ring was expected to provide distinct structural configuration as the cationic ring is slightly removed from the hydrocarbon or perfluorocarbon groups. The main goal in this effort was to expediently identify a sorbent with superior P IAS adsorption capability. Thus, after the synthesis and characterization a number of materials, the evaluation of their PFAS removal capability of these compounds was explored.

The main goal of this study was to compare the performance of our materials with existing GAC, and emerging anionic exchange resins technologies for remediation of PFAS from PFAS contaminated real world water samples. The specific granular activated carbon (GAC), FiltrasorbR 400, and ion exchange (IX) resin, Purolite: PFA694E, were chosen as these have shown distinctive performance in removing PFAS in several studies in the literature, including rapid small scale column testing (RSSCT), pilot scale, and even full-scale treatment. Performance of our materials in the presence of other components was expected to be much more challenging than prepared PFAS samples but provide faster and more meaningful information that could expedite the development of remediation technology. Hence, PFAS-impacted groundwater collected from wells located at Altus Air Force Base (AFB) in Oklahoma and was used in all our sorption experiments. Samples were collected in a steel bailer and stored at 0-4° C. until treatment, and between each site the bailer was decontaminated with methanol, deionized water, and then dried. Altus AFB groundwater samples were sent to EPA certified Pace Analytical lab to determine the concentrations of eighteen PFAS using EPA 537.1 method. Table 4 shows the concentrations of PFAS present in the untreated groundwater control sample of the groundwater (WL016) determined by Pace Analytical lab, eight PFAS species were present in detectable concentrations.

TABLE 4

WL-016 PFAS Composition determined by Pace Analytical Lab

| PFAS Cmpd. | Conc. (ng/L) | % PFAS |
|---|---|---|
| PFHxS | 320,000 | 37.5 |
| PFOS | 310,000 | 36.3 |
| PFHxA | 92,000 | 10.8 |
| PFBA* | 63,000 | 7.4 |
| PFOA | 42,000 | 4.9 |
| PFBS | 18,000 | 2.1 |
| PFHpA | 7,300 | 0.9 |
| PFNA | 480 | 0.1 |
| PFDA | 280 | 0.0 |
| HFPO-DA | ND | ND |
| NEtFOSAA | ND | ND |
| NMeFOSSA | ND | ND |
| PFDOA | ND | ND |
| PFTDA | ND | ND |
| PFTrDA | ND | ND |
| PFUnA | ND | ND |
| 11-CIPF3OUdS | ND | ND |
| 9-CIPF3ON | ND | ND |
| DONA | ND | ND |
| Total PFAS | 853,060 | 100.0 |

*PFBA determined by Weaver Labs;
ND: not detected.

PFBA was not analyzed by Pace Analytical lab as it is not included in EPA 537.1 method, but the concentration was determined to be 63 ug/L. The total PFAS concentration was determined to be 853 ug/L. Importantly, PFOS, PFOA and PFBA were focused upon, both PFOA and PFBA made up only small components of the total known PEAS contaminants and therefore would necessarily have to compete for binding sites. PFAS removal capability of GAC and IX rely heavily upon composition of water. Thus, the samples were collected from two different wells (WL016 and WL005) both located on Altus AFB, and though not quantitively characterize them in terms of organic and inorganic co-contaminants, qualitative differences in the salinity were observed. Namely, the addition of methanol to WL005 caused precipitation while no precipitation was observed with WL016. Additionally, a subtle difference in pH was also observed. Specifically, WL005 had a pH of 7.4 compared to 7.0-7.1 for WL016.

Sorption of PFOA, PFOS, and PFBA.

In the batch sorption study using FMV2 and FMV3, and FMV6-12 equal mass of each sorbent was exposed to equal volume of Altus AFB groundwater for 2 h, before the supernatant was removed and analyzed. While the collected groundwater contains several other PFAS (Table 1, shown above), the focus on this sorption study was on PFOA, PFOS, and perfluorobutanoic acid (PFBA). PFOA and PFOS are well studied and PFBA was selected as a short chain PFAS since it typically displays faster breakthrough. Under these conditions, the limitation of current technologies is evidenced by the dramatically lower fraction of PFAS removed by GAC, IX, and PAC. The materials performed well in the PFOA and PFOS remediation studies and displayed excellent affinity, with only FMV9 removing less PFOA and PFOS when compared to the current state-of-the-art material GAC and IX. Inspection of FMV9 which contains a fluorous motif, a hydrophobic region, an amine, and an amide motif displayed poor performance, demonstrating the importance of structural order of the motifs for effective PFAS removal. In sharp contrast, the remarkable performance of both the compounds of FMV8 and FMV12 were shown to remove greater than 90% both PFOS and PFOA when using a 10 mg loading. However, under these conditions, FMV12 failed to remove significant quantities of PFBA, while FMV8 removed greater than 85%, highlighting the influence of the fluorous motif. Importantly, while using FMV8 at half the loading with water from WL005 which has higher PFOA, PFOS, and PFBA loading than WL016, it still showed greater than 90% removal for PFOS and PFOA but only removed −45% of the PFBA, suggesting that indeed PFBA will likely be among the first PFAS to breakthrough. Even under less-than-ideal conditions, it still dramatically outperformed PAC used at twice the loading in terms of PFBA removal (~10%). While FMV6, which differs from FMV8 in the electrostatic component (i.e., imidazolium vs amine), and FMV12 which differs in the fluorophilic component (i.e., C8H17 vs. C8F17) both performed reasonably well until PFBA was assessed where each performed substantially worse—retaining almost no PFBA. This highlights the essential nature of all these features to remove challenging PFBA. Structurally, FMV8 and FMV12 are identical except for the presence of a fluorophilic component in FMV8 and while its importance is not evident from comparing the removal of PFOA a d PFOS, it manifests itself in the removal of the challenging short-chained PFBA. Nearly identical, and excellent, PFOA/PFOS removal efficacy were found with the FMV6 and FMV7 suggesting amine or ammonium entities have little impact, though a difference was observed in its ability to bind PFBA, which was slightly higher for the positively charged FMV7. Due to their attractive electrostatic interactions, several groups have suggested incorporating amines or permanent charged quaternary amines (better described as ammoniums) to the sorbents to enhance binding affinity towards anionic PFAS (at neutral pH) in PFAS spiked water. For instance, amines or ammoniums have been shown to enhanced PFAS adsorption in several different types of materials, including hydrogel sorbents developed by Kameoka and Chu, ionic gels developed Coronell and Leibfarth, and fluorous microgel star polymers developed by Terashima and Sawamoto. Again, while the FMV10 and FMV11 remove PFOA and PFOS about equally, these molecules show slightly lower affinity for PFOA compared to their analogous but FMV6 and FMV7 illustrating the significance of the fluorous component. However, all four molecules performed poorly at removing PFBA, again highlighting the importance of combining all the attractive features as in FMV8. Consistent with reports from the literature, the ion exchange resin (IX) outperformed GAC. Thus, our library of materials provides insights into the tuning of key electrostatic, hydrophobic, fluorous-fluorous interactions, and structural configurations that allow us to maximize the PFOA, PFOS, and PFBA binding affinity which have been benchmarked against GAC and IX.

Influence of Particle Size and Surface Area

Figure 2:
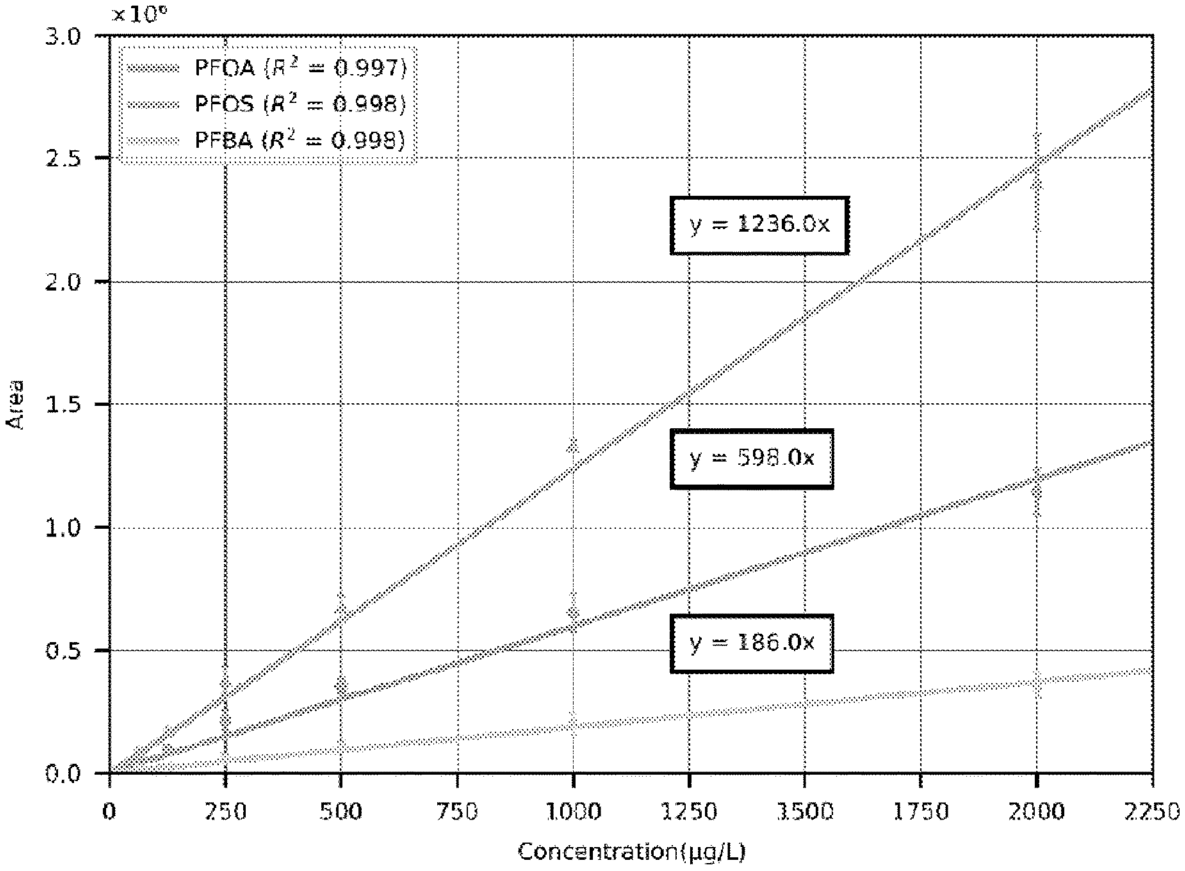
FIG. 2 is a graphical representation of a calibration curves of PFOA, PFOS, and PFBA. Area is defined in minutes.

The surface area and particle size of any material is expected to affect the sorption kinetics, so the performance of Fluor Mop materials is expected to be finer than GAC. Powdered activated carbon (PAC) with smaller particles possess larger surface area thus faster adsorption kinetics when contrasted with GAC d e to shorter internal diffusion and greater site accessibility. To carry out comparative sorption experiments, an activated carbon with a surface area that is on par with or greater than our material was accessed. PAC is moderately effective at removing longer chain PFAS like PFOA and PFOS but not as effective in removing shorter chain PFAS. More importantly PAC performance is significantly impacted by PFAS dose and water quality and, unlike GAC, spent PAC is not reactivated because of the potential for a related dust explosion. PAC derived from coconut shell activated carbon powder of Mesh 325 (45 μm particle size) was used for a closer comparison of the effect of porosity on sorption. Although, the pore size of the materials after their functionalization was not determined. It is reasonable to assume that the functionalization did not significantly alter the particle size from its precursor particle size of 40-63 μm with 230×400 mesh. Hence, most of the PAC is expected to have a smaller particle size and a corresponding greater surface area. The results are shown in FIG. 2. Using a WL016 sample and 10 mg of sorbent, excellent PFOS removal was observed for PAC (92%). However, its PFOA performance was somewhat diminished (68%) compared to FMV8 (94%) and was strikingly diminished when its PFBA removal capability was examined 9% vs. 86%. The disappointing short-chained PFAS removal capability of PAC has previously been observed. Also consistent with the literature, PAC was found to have higher PFOA and PFOS adsorption capacity than GAC (FIG. 1). The treated, untreated control samples (run in parallel like treated samples but had no sorbent material), and treated samples were shipped to Pace Analytical for analysis using EPA method 537.1. Results were determined by comparison to untreated or control.

Validation of Material's Performance, Mapping Profile

To validate the finding and explore a broader set of PFAS, Altus AFB groundwater samples that had been treated with several sorbents were sent to EPA certified Pace Analytical lab to determine the concentrations of eighteen PFAS using EPA 537.1 method. In addition to the control sample, other samples (50 mL of WL016) that had been treated with 30 mg of sorbent (Fluor Mop, GAC, and IX resin) in the Pace analysis. The results demonstrated the remarkable performance of FMV8, which was able to remove all nine PFAS above 97%. There is no doubt this sorbent material has higher PFAS removal capability than all the other tested material, both in terms of capacity and generality for PFAS material. The second-best performer was found to be FMV3. The performance of FMV6 was comparable to FMV8. In addition to affirming the broad selectivity of FMV3 towards PFAS, this study also provides insight that might be useful for tuning material specific to a particular PFAS entity removal. For example, FMV10 shows higher PFOA removal than PFOS which is an unusual preference. Normally, the performance of GAC in PFAS removal depends upon both the functional group and the carbon chain length of the PFAS member. Typical y, within PFAS with the same number of carbons, the sulfonic acid (PFSA) functionality adsorbs stronger than the carboxylic acid (PFCA) of the same number. For instance, PFOS breakthrough is generally observed after PFOA breakthrough. Another interesting behavior of FMV10 can be seen in its greater affinity for challenging PFHpA against even longer chain PFOS. Arguably, much of the selectivity variation of PFAS sorption is driven by the physicochemical properties of the PFAS species. As a result, a significant impact is seen in PFAS adsorption behavior within different chain length PFAS. Longer chain PFOS and PFOA exhibit higher hydrophobic effects than short chain PFAS, and thus have greater adsorption propensity to GAC. Perfluorosulfonic acid (PFSA) of similar chain length are preferentially removed over perfluroalkanoic acid (PFCA) due to their higher hydrophobicity which results from the presence of the extra fluorinated carbon ($CF_2$). Taken all together, this study largely validates our central remise that a fluorophilic group can drive the binding affinity of PFAS and allow the design of more effective and general PFAS selective sorbents.

Regeneration and Reuse of the FM Materials

Another major objective was to develop materials t at possessed the ability to be regenerated and reused for multiple cycles without diminished performance. To properly assess this, it was critical to use real-world samples as they possess both challenge analytes that can not only compete for sites but can also foul the material in other ways. Experiments were conducted to determine a nondestructive regeneration of materials. Leading materials, FMV8 and FMV12 were assessed using Altus AFB groundwater samples for each PFAS loading cycle. The optimized a detergent based solvent system, an aqueous based solvent system, an organic based solvent system, and an aqueous/organic based solvent system was used to was the sorbents free of adsorbed PFAS. While the groundwater contains many other PF S as shown in Table 4, only PFOA and PFOS concentrations were monitored.

Figure 18:
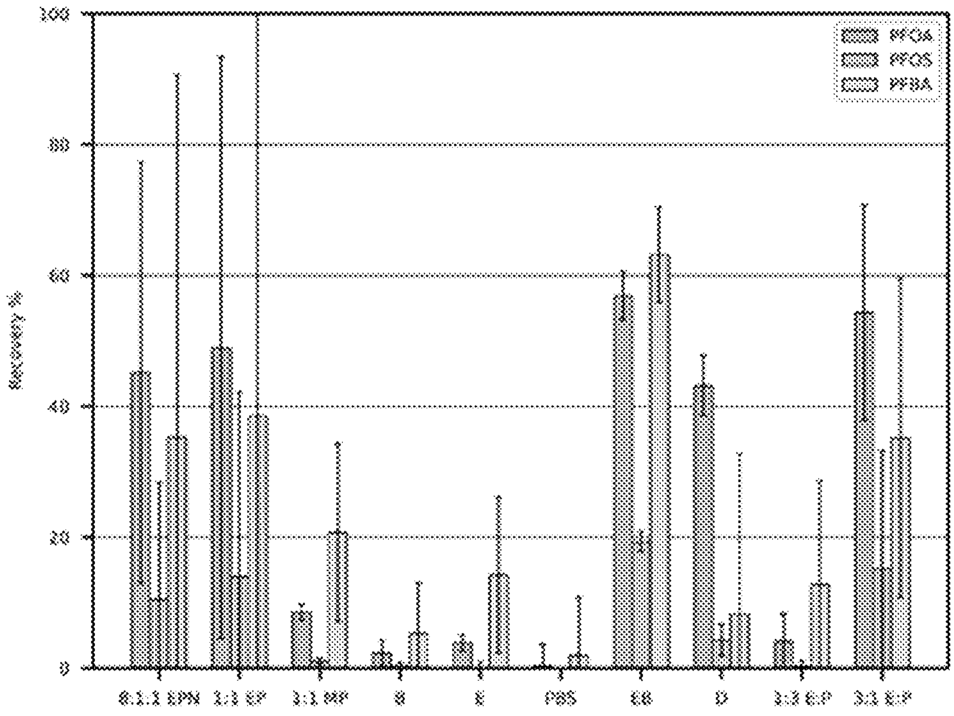
FIG. 18 is a graphical representation showing the % recovery of the PFAS after a single wash of the PFAS contaminated FMV8 using a variety of solvents.

To evaluate the use of a detergent based solvent s stem, an aqueous based solvent system, an organic based solvent system, and an aqueous/organic based solvent system on removal of PFAS from contaminated PFAS contaminated FMV8, a single wash was conducted using a wide range of solvent washing systems was performed. In this study, the following washing systems were evaluated: saturated ethanolic brine solution (EB); ethanol:phosphate buffer saline: 2 mM ammonium acetate (8:1:1 EPN) solution; ethanol:phosphate buffer saline (1:1 EP) solution; methanol:Phosphate Buffer Saline (1:1 MP) solution; saturated brine solution (B); ethanol (E); phosphate buffer saline (PBS); 10% Dawn™ detergent; ethanol:phosphate buffer Saline (1:3 EP) solution; and ethanol:phosphate buffer saline (3:1 EP) solution. The results of this study are shown in FIG. 18 after a single wash. The results demonstrate that saturated ethanolic brine solution (EB) would be effective in the regeneration process using 3 to 5 washes, followed by a wash with water.

Figure 19:
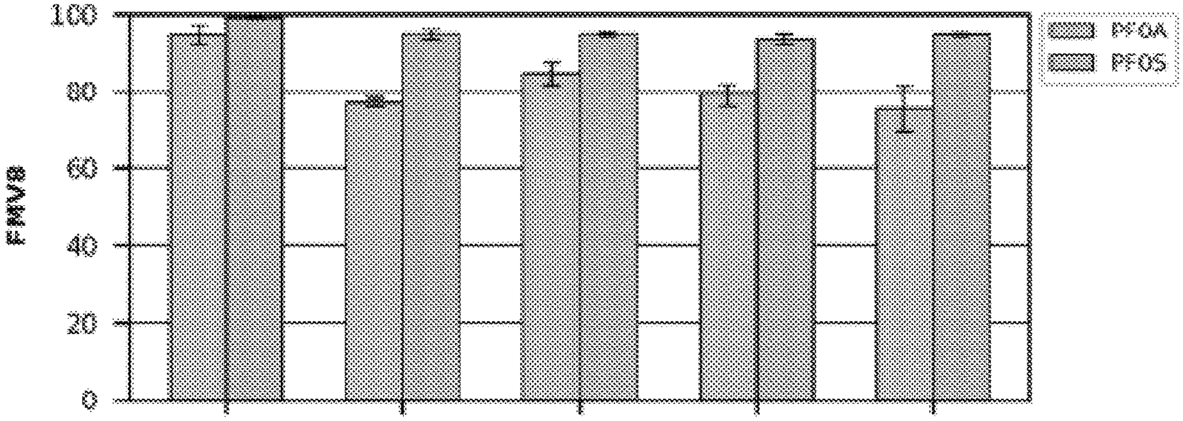
FIG. 19 is a graphical representation showing the r generation-adsorption cycles. 10 mg of FMV8 and control (no sorbent) were incubated with 50 mL Altus AFB Well 016 water and analyzed as described in the experiments.
Figure 20:
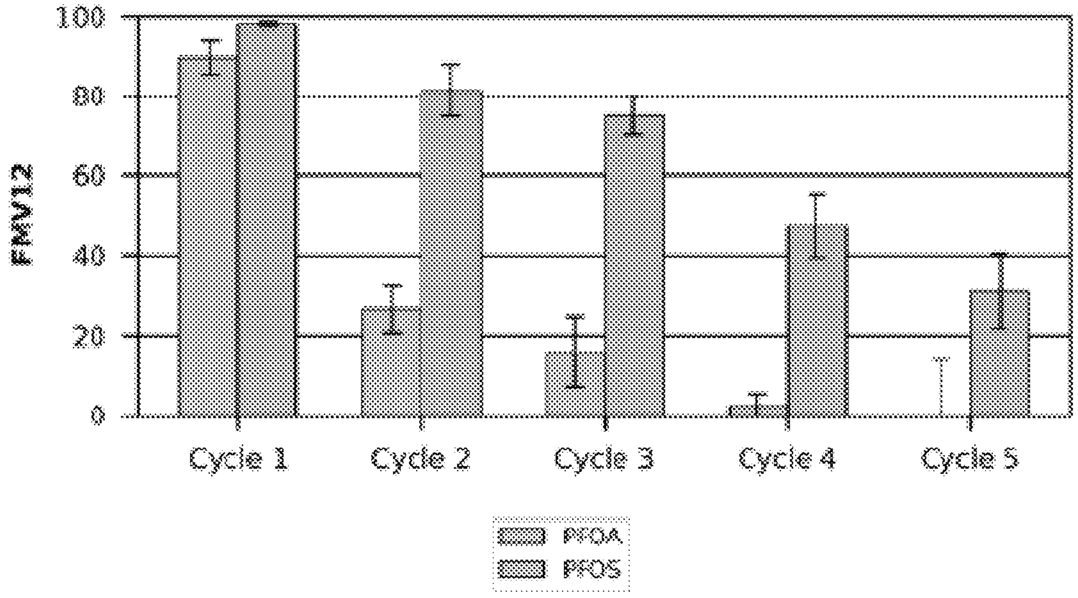
FIG. 20 is a graphical representation showing the r generation-adsorption cycles. 10 mg of FMV12 and control (no sorbent) were incubated with 50 mL Altus AFB Well 016 water and analyzed as described in the experiments.

The challenge of ensuring complete desorption was accomplished by washing each material 5 times with different concentrations of ammonium acetate, ethanol, PBS, and methanol. After the last wash, the filtrate was checked by LC/MS and compared to a standard of DI water and methanol to ensure the PFASs were sufficiently desorbed (within the error of the standard). While the desorption procedure is still unoptimized in terms of efficiency, this extensive washing procedure allowed us to know complete PFOA/PFOS desorption took place before the next loading cycle occurred. Future efforts will focus on optimizing the desorption aspect. Subsequent, adsorption experiments were performed using the regenerated Fluor Mop materials. Remarkably, in the case of FMV8, within the margin of error, no change in PFOS adsorption was observed (FIG. 19). In cycle 2, a modest decrease in PFOA removal was observed, but subsequently remains almost unchanged thereafter through cycle 5. In stark contrast, the reuse of FMV12 led to successive decline in PFOS removal efficacy and a dramatic decline of PFOA adsorption efficacy (FIG. 20). The exact reason for poor resilience of FMV12 is not yet clear and warrants further investigation, but there are several potential reasons. An intriguing possibility is that the fluorophilic component present in FMV8 but not within FMV12 imparts structural stability to the material, or that co-contaminants adsorb on FMV12 but do not desorb using the detergent-based wash solvent. The recyclability is a critically important feature in determining the cost of the material and will continue to be studied moving forward. Importantly, the fluorinated motif seems to impart a resilience to the material which may be structural in nature or may be because of inherently greater selectivity for PFAS over the other co-contaminants.

CONCLUSION FROM REMEDIATION

A designed novel class of smart materials were prepared that are unique in structure and supply different key attractive forces that can combine to selectively attract PFAS from PFAS polluted water. Some of these Fluor Mop (FM) materials have demonstrated excellent sorption capability for not only PFOA and PFOS but all other PFAS tested as well, with several materials performing well even with challenging short chain PFAS, from real world PFAS contaminated groundwater. T e data has shown that fluorinated FMV8 can be regenerated and reused for at least 5 cycles without significantly compromising PFOA and PFOS removal capability using challenging real world PFAS impacted groundwater. Overall, the different PFAS-attractive features of the Fluor Mop materials have proven to all be important, and when all the attractive elements are included the Fluor Mop material very efficiently removes PFAS. The fluorinated motif increases the selectivity and imparts a resilience to our material.

What is claimed is:

1. A compound of Formula (II):

Formula (II)

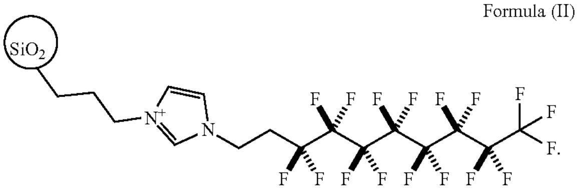

2. A method of removing a PFAS contaminate from PFAS contaminated water supply comprising:

a) contacting the PFAS contaminated water supply with a compound of Formula (II)

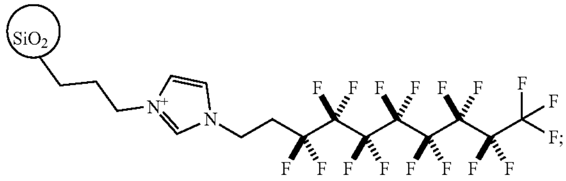

b) binding a PFAS contaminate in the PFAS contaminated water supply with the compound of Formula (II) forming a PFAS bound compound of Formula (II); and c) isolating the PFAS bound compound of Formula (II) from the PFAS contaminated water supply.

3. The method of claim 2, wherein the PFAS contaminate comprises perfluorobutanoic acid (PFBA), perfluorobutane sulfonic acid (PFBS), perfluorodecanoic acid (PFDA), perfluoroheptane sulfonic acid (PFHpS), perfluorododecanoic acid (PFDoA), perfluoroheptanoic acid (PFHpA), perfluorohexane sulfonic acid (PFHxS), perfluorohexanoic acid (PFHxA), perfluorononanoic acid (PFNA), perfluorooctanoic acid (PFOA), n-perfluorooctanoic acid (n-PFOA), branched perfluorooctanoic acid (Sb-PFOA), perfluorooctane sulfonic acid (PFOS), n-perfluorooctane sulfonic acid (n-PFOS), branched perfluoromethylheptane sulfonic acid (Sm-PFOS), perfluorooctane sulfonamide (PFOSA or FOSA), perfluoropentanoic acid (PFPeA), perfluoroundecanoic acid (PUFA or PFUnDA), 2-(N-ethyl-perfluorooctane sulfonamido) acetic acid (EtFOSAA), 2-(N-methyl-perfluorooctane sulfonamido) acetic acid (Me-PFOSA-AcOH or Me-FOSA-A), 9-chlorohexadecafluoro-3-oxanonane-1-sulfonic acid (9Cl-PF3ONS), Adona (4,8-dioxa-3H-perfluorononanoate), GenX (2,3,3,3-tetrafluoro-2-(1,1,2,2,3,3,3-heptafluoropropoxy)-propanoic acid (HFPO-DA)), or combinations thereof.

4. The method of claim 2, wherein an amount of the PFAS contaminate in the PFAS contaminated water supply is reduced by at least about 90%.

5. The method of claim 2, wherein the water supply contaminated with the PFAS contaminate comprises one or more of ground water, well water, municipal water, river water, and lake water.

6. A method for regenerating a compound of Formula (II)

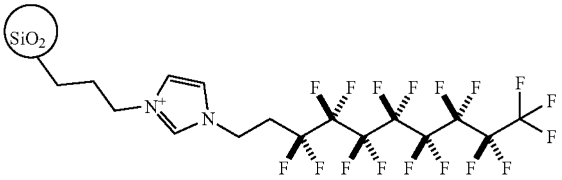

from a PFAS bound compound of Formula (II) comprising:

a) washing the PFAS bound compound of Formula (II) with different concentrations of an aqueous solvent, an organic solvent, different mixtures of an organic/different concentrations of an aqueous solvent mixture, or a combination thereof forming the compound of Formula (II);

b) washing the compound of Formula (II) from step (a) with water; and c) drying the compound of Formula (II) from step b).

7. The method of claim 6, wherein the PFAS bound compound of Formula (II) comprises contacting with the organic/different concentrations of an aqueous solvent mixture in step a).

8. The method of claim 7, wherein the organic/different concentrations of an aqueous solvent mixture comprise a saturated ethanolic brine mixture in step a).

9. The method of claim 4, wherein the PFAS bound compound of Formula (II) comprises washing the PFAS bound compound of Formula (II) at least 3 times in step a).

10. The method of claim 9, wherein the PFAS bound compound of Formula (II) comprises washing the PFAS bound compound of Formula (II) at least 5 times in step a).

11. The method of claim 6, wherein the compound of Formula (II) comprises drying the compound at a temperature from about 40° C. to about 80° C. under vacuum in step c).

12. The method of claim 6, wherein the method comprises recovering the compound of Formula (II) in at least 90%.

* * * * *